(12) United States Patent
Watanabe et al.

(10) Patent No.: US 7,276,313 B2
(45) Date of Patent: Oct. 2, 2007

(54) BATTERY AND RELATED METHOD

(75) Inventors: Kyoichi Watanabe, Yokosuka (JP); Hideaki Horie, Yokosuka (JP); Hiroshi Sugawara, Yokosuka (JP); Takaaki Abe, Yokosuka (JP); Osamu Shimamura, Yokosuka (JP); Yuuji Tanjou, Yokohama (JP); Takanori Itou, Zushi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 567 days.

(21) Appl. No.: 10/419,858

(22) Filed: Apr. 22, 2003

(65) Prior Publication Data

US 2003/0224246 A1 Dec. 4, 2003

(30) Foreign Application Priority Data

Jun. 3, 2002 (JP) ............................ P2002-161333

(51) Int. Cl.
*H01M 2/02* (2006.01)
*H01M 2/24* (2006.01)
*H01M 2/26* (2006.01)

(52) U.S. Cl. .................. 429/159; 429/66; 429/211; 29/623.1

(58) Field of Classification Search ............... None
See application file for complete search history.

(56) References Cited

U.S. PATENT DOCUMENTS

| | | | |
|---|---|---|---|
| 4,204,036 A | 5/1980 | Cohen et al. | |
| 4,429,026 A | 1/1984 | Bruder | |
| 4,592,972 A | 6/1986 | Juergens et al. | |
| 5,474,859 A | 12/1995 | Takeuchi et al. | |
| 5,948,562 A | 9/1999 | Fulcher et al. | |
| 5,965,249 A | 10/1999 | Sutton et al. | |
| 6,224,997 B1 | 5/2001 | Papadopoulos | |
| 6,294,128 B1 | 9/2001 | Crosbie | |

(Continued)

FOREIGN PATENT DOCUMENTS

EP  1041002 A2  10/2000

(Continued)

OTHER PUBLICATIONS

European Search Report Issued in corresponding European Patent Application No. 06015921.7-2119, dated on May 3, 2007.

*Primary Examiner*—Dah-Wei Yuan
*Assistant Examiner*—Karie O'Neill
(74) *Attorney, Agent, or Firm*—McDermott Will & Emery LLP

(57) ABSTRACT

A battery comprises at least two unit cells. Each of the at least two unit cells is provided with an outer sheath film composed of polymer-metal composite material, a positive-electrode current collector, a negative-electrode current collector, a separator disposed between the positive-electrode current collector and the negative-electrode current collector, one positive electrode tab to which the positive-electrode current collector is connected and protruding from a first sealed portion of the outer sheath film, one negative electrode tab to which the negative-electrode current collector is connected and protruding from a second sealed portion of the outer sheath film, a first polymer layer disposed between the positive electrode tab and the outer sheath film, and a second polymer layer disposed between the negative electrode tab and the outer sheath film.

19 Claims, 24 Drawing Sheets

U.S. PATENT DOCUMENTS

| | | | |
|---|---|---|---|
| 6,877,216 B2 * | 4/2005 | Fukuda et al. | 29/730 |
| 2001/0021471 A1 | 9/2001 | Xing et al. | |
| 2002/0146620 A1 * | 10/2002 | O'Connell | 429/161 |
| 2003/0113621 A1 * | 6/2003 | Shamura et al. | 429/162 |

FOREIGN PATENT DOCUMENTS

| | | | |
|---|---|---|---|
| EP | 1049185 A1 | | 11/2000 |
| JP | 7-99048 A | | 4/1995 |
| JP | 11260414 A | * | 9/1999 |
| JP | 11-273643 | | 10/1999 |
| JP | 2001-57203 A | | 2/2001 |
| WO | WO87/07434 A | | 12/1987 |
| WO | WO96/12313 | | 4/1996 |

* cited by examiner

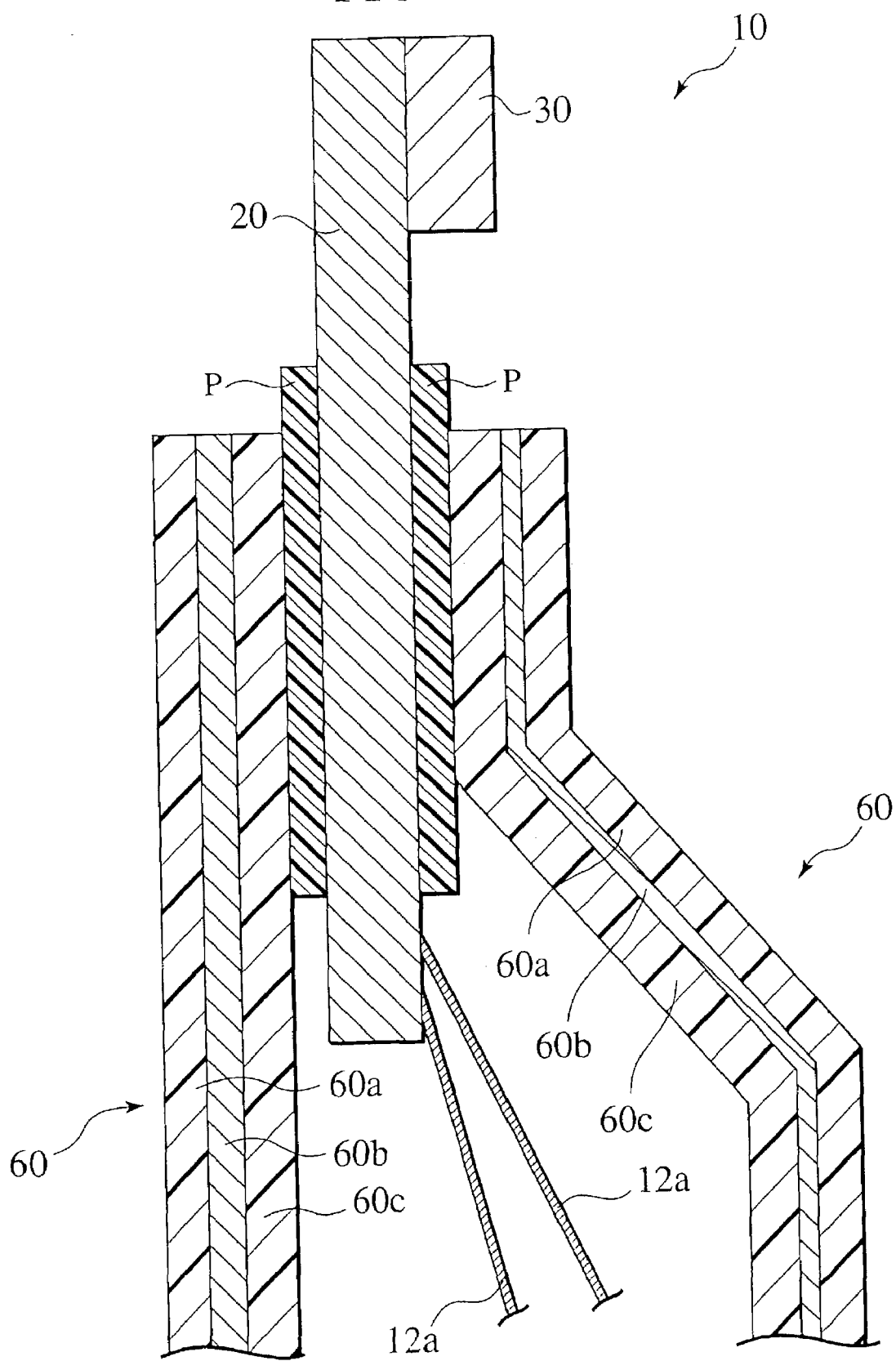

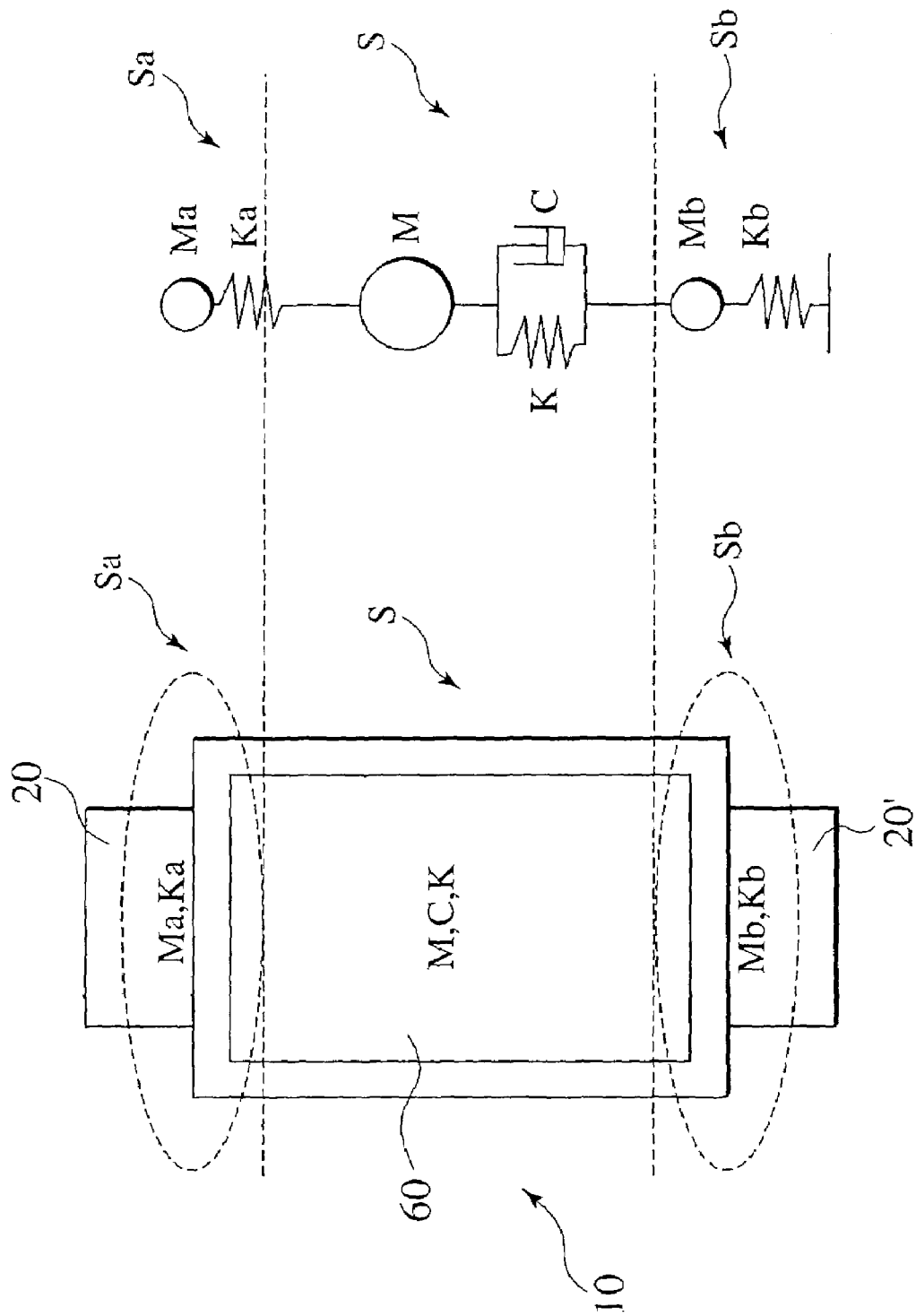

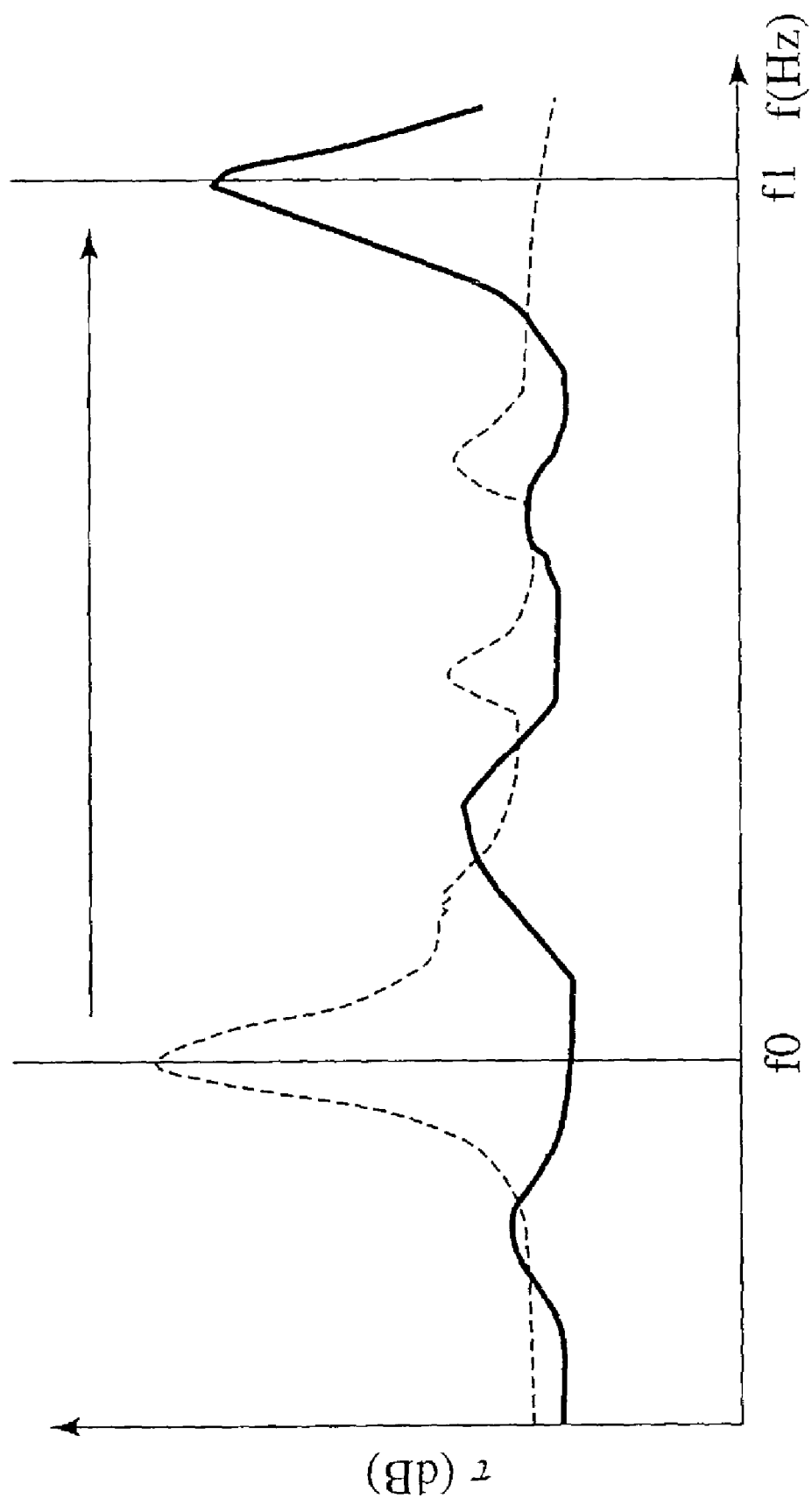

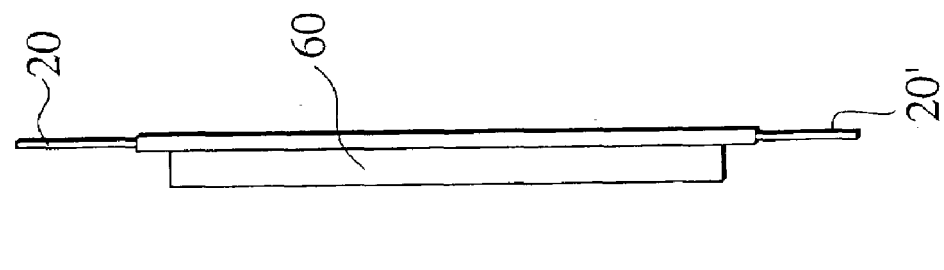
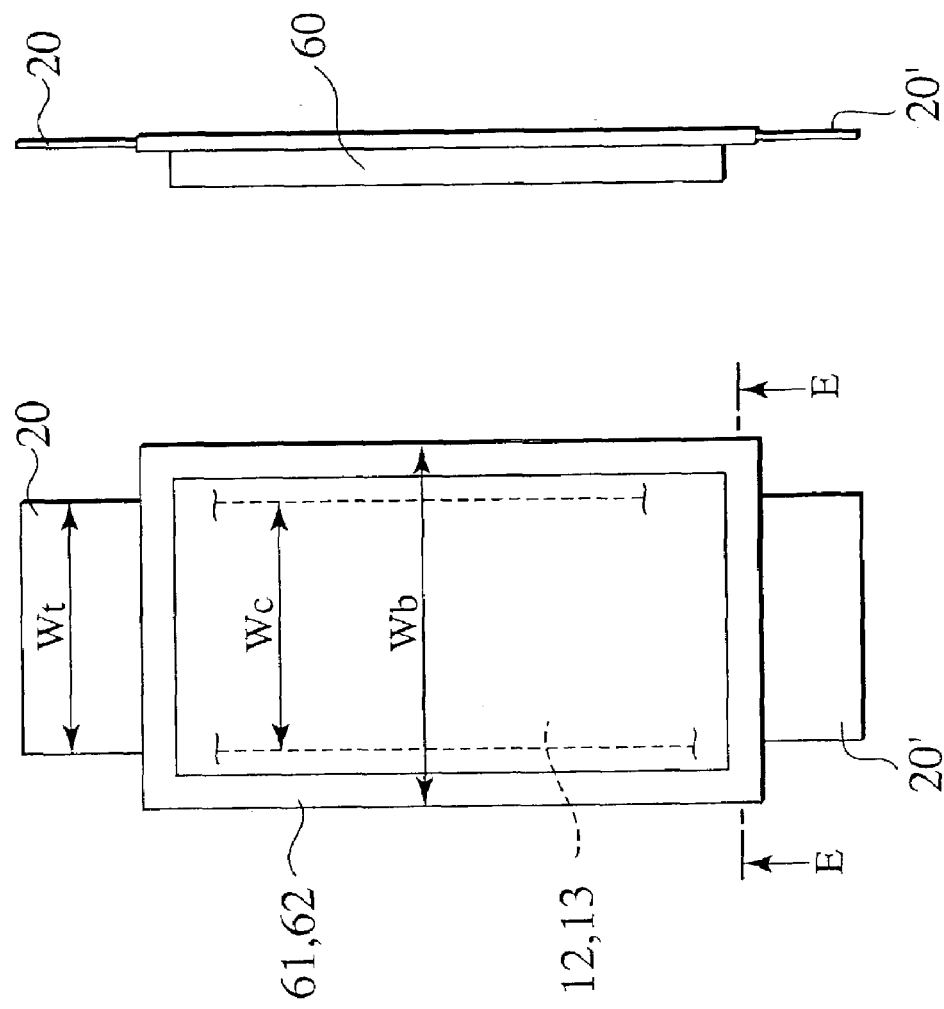

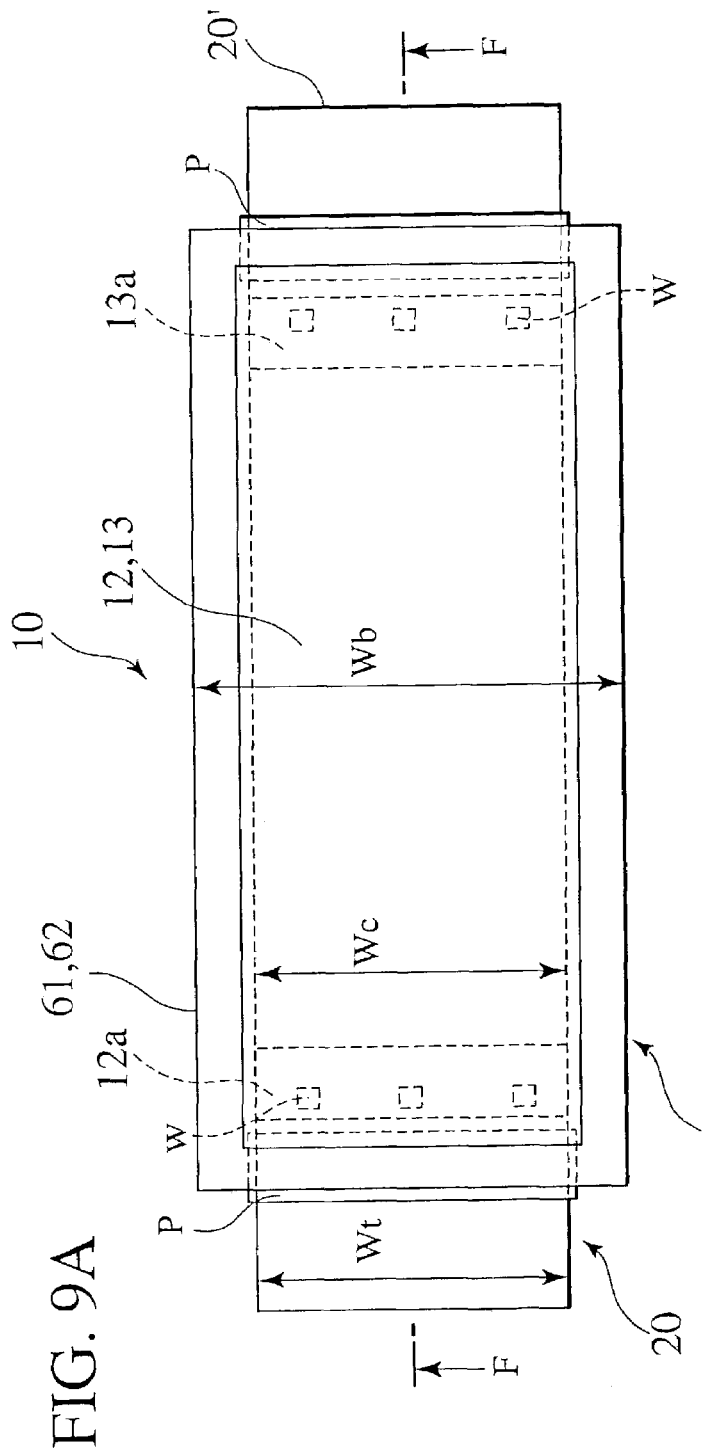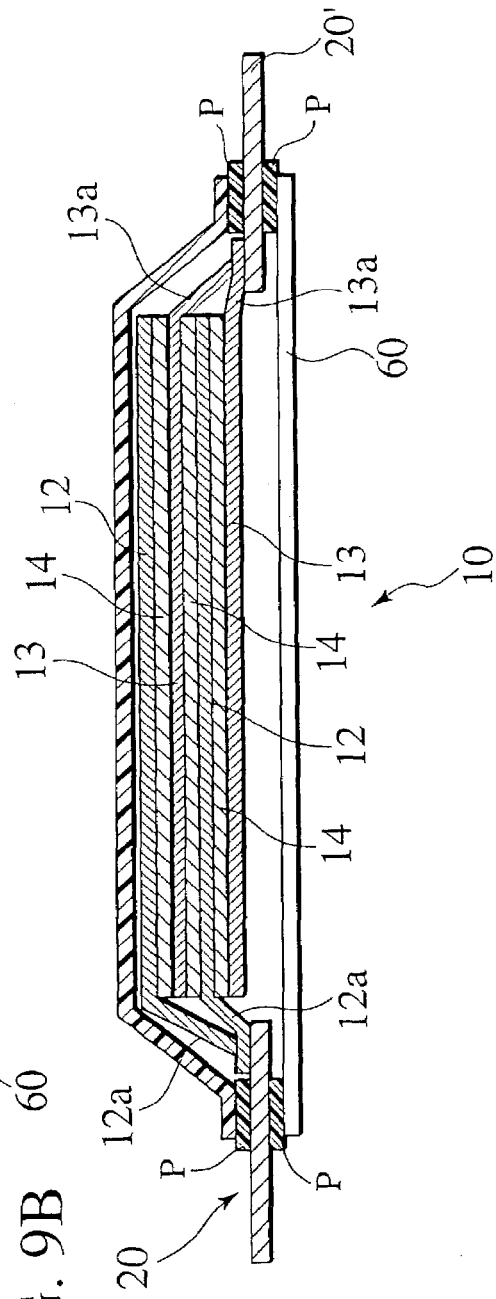
FIG. 9A
FIG. 9B

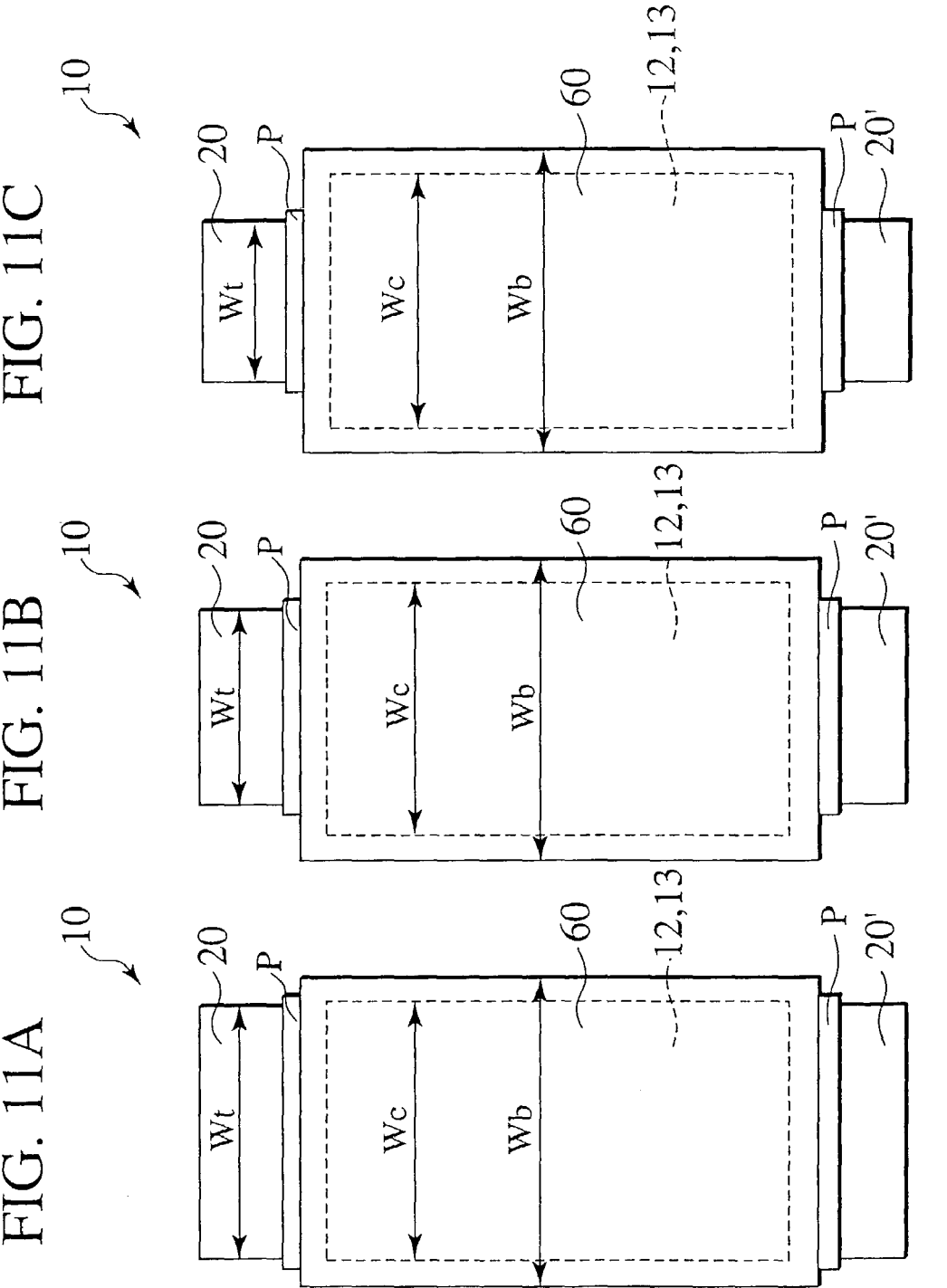

Wt/Wc=1.0

Wt/Wc=0.5

Wt/Wc=0.6

Wt/Wc=0.6

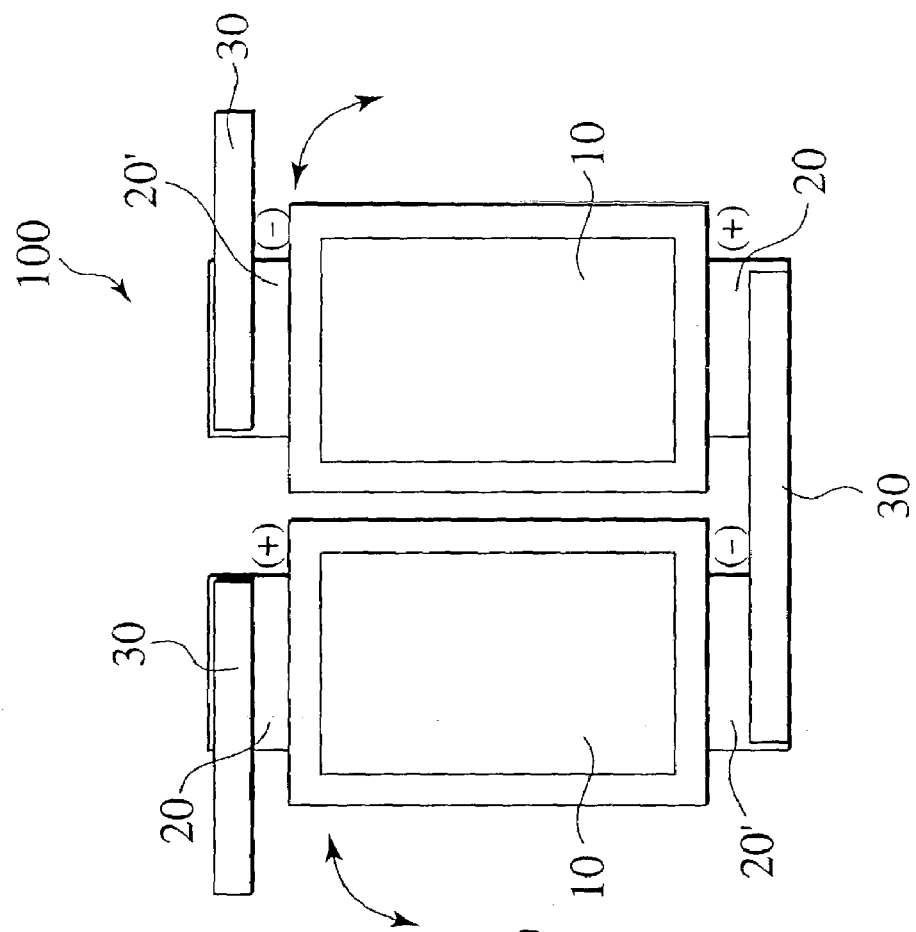
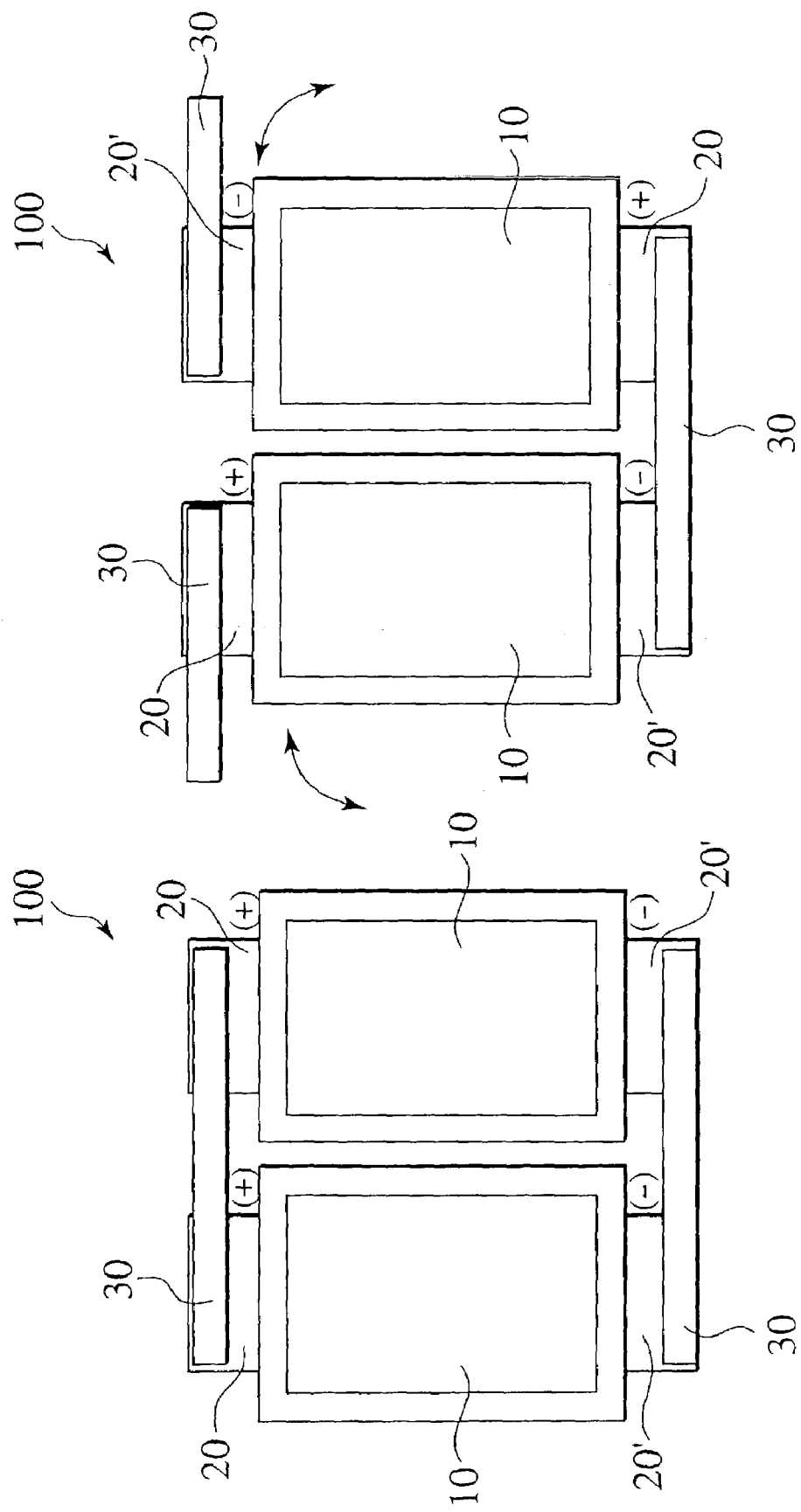

BATTERY AND RELATED METHOD

BACKGROUND OF THE INVENTION

The present invention relates a battery and a related method and, more particularly, to a battery and a related method which has a vibration absorption structure adapted to define a structure of a tab portion of a unit cell forming the battery so as to eliminate vibrations to be inputted principally from outside while precluding deterioration in a heat performance and decreasing internal resistance.

In recent years, there has been a progressively increasing social demand for secondary batteries that are chargeable and dischargeable as power sources in a variety of applications from portable devices to vehicles. Among these, when used as the power source for a vehicle, since only one unit cell has an inability of providing a sufficient power, it is conceived to use a battery which employs a plurality of unit cells arranged in a series connection, a parallel connection or a combination of the series connection and the parallel connection.

Since the battery with the plurality of unit cells being connected in such ways is usually used under circumferences where vibrations are inputted, resulting vibrations are transferred to bus bars and terminal portions, both of which form connecting portions for the unit cells.

Japanese Patent Application Laid-Open Publication No. H11-273643 discloses a structure wherein unit cells are mutually connected to one another through the use of rubber cushioning members.

SUMMARY OF THE INVENTION

However, according to considerable studies conducted by the present inventors, with such a structure, the rubber cushioning members are located for only connecting portions at both sides of a cylindrical can forming a unit cell, it is conceived that natural frequencies, such as primary and secondary ones appearing in a direction along a length of the cylindrical can, have increased amplitudes in a central area, a portion corresponding to a ¼ wavelength, a portion corresponding to a ¾ wavelength, and the like. Further, it is conceivable that, since such a stress is imparted directly to the rubber cushioning members at the both sides of the cylindrical can, there is a need for enhancing adequate durability of the rubber cushioning members.

Further, since with the unit cell that includes an outer sheath made of a laminated body of polymer-metal composite material such as a laminated member, the unit cell per se has a low rigidity, it is hard to fixedly secure the unit cell using such rubber cushioning members. That is to say, if such unit cells are used in the circumference where vibrations are inputted, the bus bars and the terminals portions, both of which are the connecting portions, cannot help being directly subjected to such resulting vibrations. Consequently, it is highly desirable for such a laminate battery to be formed in a novel structure that enables a vibration resistant property to be improved while maintaining or improving a battery performance.

The present invention has been completed upon the considerable studies by the present inventors set forth above and has an object to provide a battery and a related method that is able to simultaneously attain a vibration absorption effect and a performance-degradation preventive effect, which have not been conventionally obtained, to exclude the connecting portions in the battery from being adversely affected by vibrations, while preventing deterioration in a heat resistant property and an increase in resistance.

To achieve this object, the present invention contemplates to provide a battery having at last two unit cells, each of which has an outer sheath composed of a polymer-metal composite film, a positive-electrode current collector and a negative-electrode current collector are connected to a positive electrode tab and a negative electrode tab, respectively, which protrude from sealed portions of the polymer-metal composite outer sheath, and a polymer layer disposed at a boundary area between the outer sheath and the tabs.

More particularly, according to a first aspect of the present invention, there is provided a battery comprising: at least two unit cells, each of the at least two unit cells being provided with: an outer sheath film composed of polymer-metal composite material; a positive-electrode current collector; a negative-electrode current collector; a separator disposed between the positive-electrode current collector and the negative-electrode current collector; one positive electrode tab to which the positive-electrode current collector is connected and protruding from a first sealed portion of the outer sheath film; one negative electrode tab to which the negative-electrode current collector is connected and protruding from a second sealed portion of the outer sheath film; a first polymer layer disposed between the positive electrode tab and the outer sheath film; and a second polymer layer disposed between the negative electrode tab and the outer sheath film.

On one hand, according to another aspect of the present invention, there is provided a method of manufacturing a battery, the method comprising: preparing at least two unit cells, each of the at least two unit cells being provided with: an outer sheath film composed of polymer-metal composite material; a positive-electrode current collector; a negative-electrode current collector; a separator disposed between the positive-electrode current collector and the negative-electrode current collector; one positive electrode tab to which the positive-electrode current collector is connected and protruding from a first sealed portion of the outer sheath film; one negative electrode tab to which the negative-electrode current collector is connected and protruding from a second sealed portion of the outer sheath film; a first polymer layer disposed between the positive electrode tab and the outer sheath film; and a second polymer layer disposed between the negative electrode tab and the outer sheath film; and connecting the at least two unit cells so as to form at least one group which includes equal to or more than two parallel connections of the at least two unit cells.

Other and further features, advantages, and benefits of the present invention will become more apparent from the following description taken in conjunction with the following drawings.

BRIEF DESCRIPTION OF THE DRAWINGS

FIG. 4 is a partial, enlarged cross sectional view of the unit cell of FIG. 3, in the embodiment;

FIG. 5 is a typical view of a mass spring model focusing on the unit cell of the battery, with a left side showing a plan view of the unit cell and a right side showing a corresponding mass spring model, in the embodiment;

FIG. 7 is a graph illustrating a vibration transfer characteristic of the unit cell, in the embodiment;

FIG. 8A is a plan view of a fundamental structure of the unit cell under a state wherein a polymer layer P is omitted, in the embodiment;

FIG. 8B is a side view of the unit cell shown in FIG. 8A, in the embodiment;

FIG. 8C is a cross sectional view taken on line E-E of FIG. 8A, in the embodiment;

FIG. 9A is a plan view of the unit cell wherein a tab width Wt and a current collector width Wc is determined to be equal to one another and the polymer layer P is provided, in the embodiment;

FIG. 9B is a cross sectional view taken on line F-F of FIG. 9A, in the embodiment;

FIG. 11A is a plan view of the unit cell wherein the tab protrudes from a short side of the unit cell formed in a rectangular shape and a ratio (Wt/Wc) between the tab width Wt and the current collector width Wc falls in a value of 1, in the embodiment;

FIG. 11B is a plan view of the unit cell wherein the ratio (Wt/Wc) falls in a value of 0.75, in the embodiment;

FIG. 11C is a plan view of the unit cell wherein the ratio (Wt/Wc) falls in a value of 0.5, in the embodiment;

FIG. 20A is a plan view of the battery, which corresponds to FIG. 1B, having the plurality of unit cells which are connected in parallel, in the embodiment;

FIG. 20B is a plan view of the battery, which corresponds to FIG. 1B, having the plurality of unit cells which are connected in series, in the embodiment;

DETAILED DESCRIPTION OF THE PREFERRED EMBODIMENT

Figure 1:
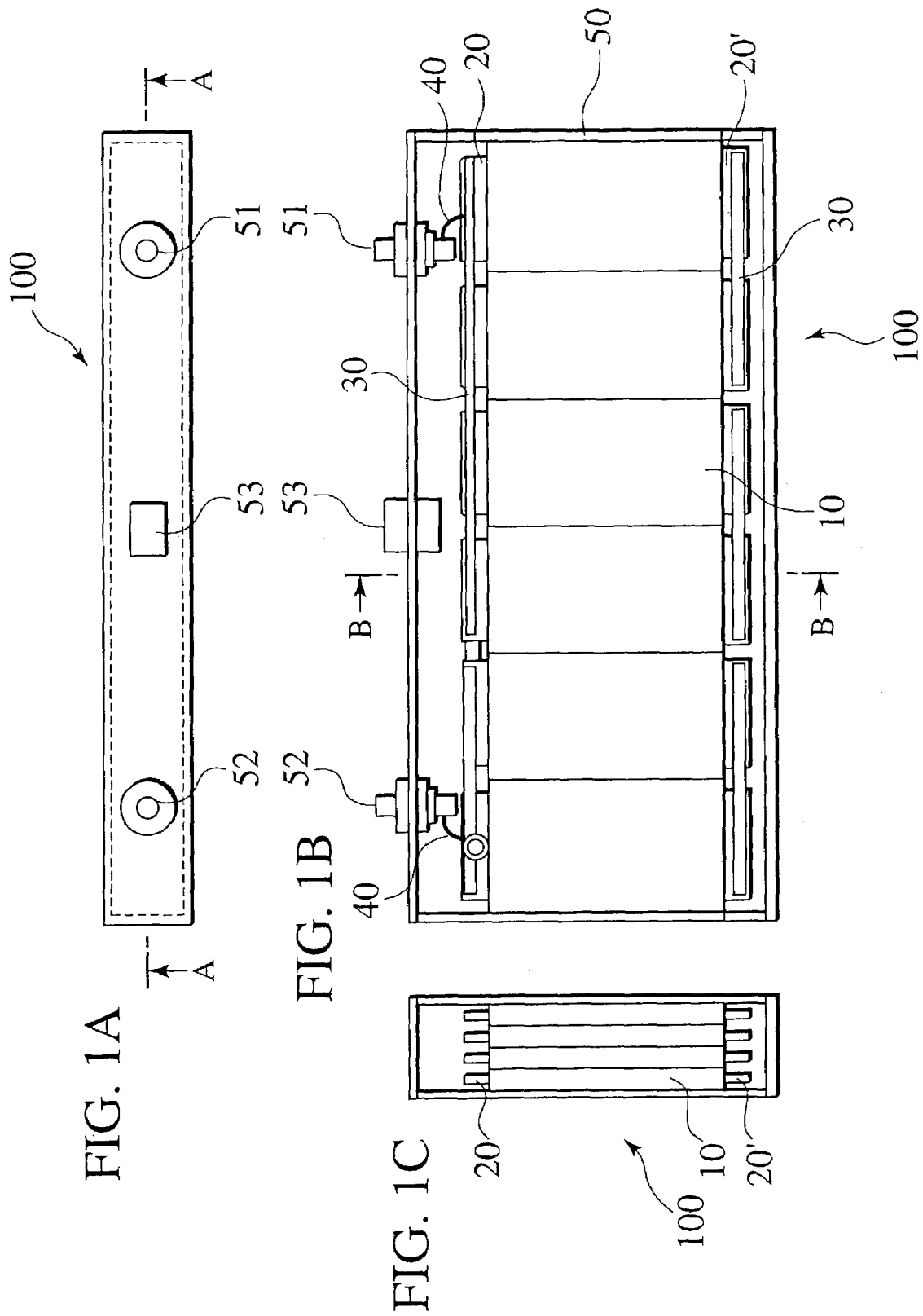
FIG. 1A is a plan view of a battery of an embodiment according to the present invention.
FIG. 1B is a cross sectional view taken on line A-A of FIG. 1A, in the embodiment.
FIG. 1C is a cross sectional view taken on line B-B of FIG. 1B, in the embodiment.

Hereinafter, a battery and a related method of an embodiment according to the present invention are described with reference to the drawings.

In general view, the presently filed embodiment relates to a vibration absorption structure, a heat resistant structure and internal resistance minimizing structure of a battery equipped with unit cells, each of which is provided with a so-called laminate outer sheath, and contemplates to eliminate deterioration in the unit cell caused by vibrations resulting from external vibrations applied to the unit cell through the use of tab shapes or resin applied to circumferences of tabs while, at the same time, preventing heat developments in the tabs during an operating condition under high electric current and, further, eliminating internal resistance of the unit cell.

Typically, the presently filed embodiment is provided with equal to or more than two unit cells. This is due to the fact that, as far as the battery is concerned, the battery includes equal to or more than two unit cells as a minimum component unit. However, it is needless to say that application of the unit cell per se of the presently filed embodiment may provide a capability of preventing a single piece of unit cell from being vibrated due to external vibrations.

FIG. 1A is a plan view of the battery of the presently filed embodiment, FIG. 1B is a cross sectional view of the battery taken on line A-A of FIG. 1A and FIG. 1C is a cross sectional view of the battery taken on line B-B of FIG. 1B. Also, FIG. 2 is a perspective view of a unit cell, FIG. 3 is a cross sectional view of the unit cell taken on line C-C of FIG. 2, and FIG. 4 is an enlarged partial cross sectional view of the unit cell shown in FIG. 3.

As shown in FIGS. 1A to 1C, a battery 100 available to be used in the presently filed embodiment is equipped with a plurality of unit cells 10 each formed in a rectangular plate shape, with the unit cells 10 being shown in a configuration of 2-parallel-12-series connection. Such a unit cell 10 is covered with a laminate outer sheath film made of polymer-metallic compound material, and current collectors of the unit cell 10 are connected to a positive electrode tab 20 or a negative electrode tab 20', respectively. Also, the tabs 20, 20' are connected to bus bars 30, using such as ultrasonic welding, respectively, and the bus bars 30 are connected to external terminals 51 and 52 of an outer case 50 equipped with a cell controller 53 having a function to regulate an output voltage between the respective unit cells 10. Besides, the number of unit cells or the like is merely for an exemplary explanation only and is not limited thereto.

Figure 2:
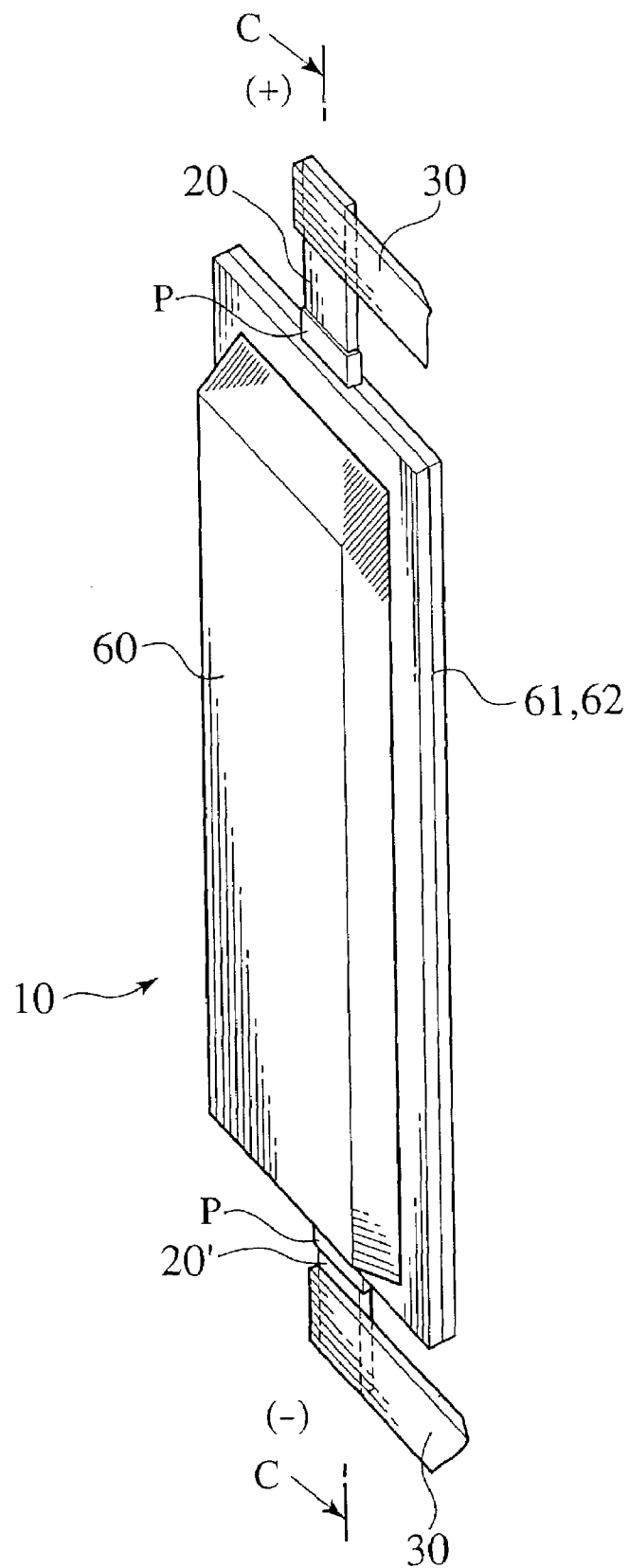
FIG. 2 is a perspective view of a unit cell forming the battery, in the embodiment.
Figure 3:
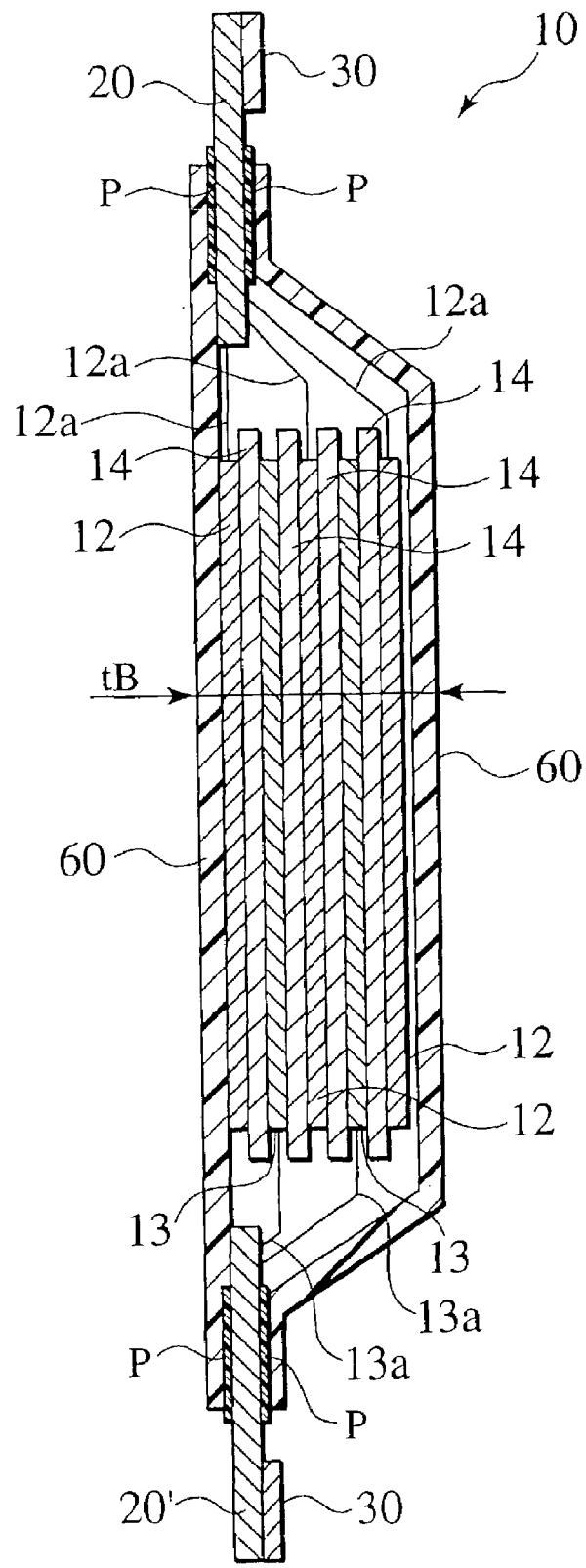
FIG. 3 is a cross sectional view taken on line C-C of FIG. 2, in the embodiment.

As shown in FIGS. 2 to 4, further, the unit cell 10 available to be used in the presently filed embodiment includes a flat type battery having an outer sheath film 60, composed of a laminate film made of polymer-metal composite material, whose peripheral portions are joined to form a thermally welded portion 61 formed by thermal welding. Here, the positive electrode tab 20 and the negative electrode tab 20' are taken out from one end and the other end of the thermally welded portion 61, respectively. In FIG. 2, also, directions in which the bus bars 30 extend are not restrictive and the bus bars 30 may extend in one direction or in both directions in compliance with particular structures in which the unit cells 10 are connected inside the battery.

More particularly, the polymer-metal compound laminate film, for use in the outer sheath film 60 of such a unit cell 10, has a structure wherein a heat resistant insulation resin film 60a is formed over an outer wall of a metal film 60b and, on the other hand, a thermal-weld insulation resin film 60c is formed over an inner wall of the metal film 60b whereupon these films are laminated. By thermally welding such laminate films in an appropriate method, the thermal-weld insulation resin films 60c are partially thermally welded and joined to form the thermally welded portion 61.

Further, a positive electrode comprised of a positive-electrode current collector 12 and the positive electrode tab 20 of the unit cell 10 has the positive-electrode current collector 12 whose reacting portion is preferably coated by positive electrode material (positive electrode active material) and subsequently dried, and a negative electrode comprised of a negative-electrode current collector 13 and the negative electrode tab 20' has the negative-electrode current collector 13 whose reacting portion is preferably coated with negative electrode material (negative electrode active material) and subsequently dried. And, the positive electrode material of the positive-electrode current collector 12 and the negative electrode material of the negative-electrode current collector 13 are suitably disposed in opposition to one another through a separator 14 formed of a sheet member, made from polymer material, to insulate the positive electrode and the negative electrode from one another and having perforations to allow electrolyte to permeate through the sheet member, and the positive-electrode current collectors 12, the separators 14 and the negative-electrode current collectors 13 are stacked in a laminated state to allow these components to be formed in a unitary structure by thermal bonding, thereby forming an electric power generating element. Also, the number of laminations is for an exemplary purpose and is not limited thereto. Also, while connector portions 12a are shown to be located at a position closer to the positive electrode tab 20 of the positive-electrode current collector 12, such connector portions 12a may be formed by suitably bending the positive-electrode current collector 12 per se or formed of separate members. Similarly, although connector portions 13a are located at a position closer to the negative electrode tab 20' of the negative-electrode current collector 13, such connector portions 13a may be formed by suitably bending the negative-electrode current collector 13 per se or formed of separate members (provided that, for the sake of convenience, both the connector portions 12a, 13a are shown as separate members in FIGS. 3 and 4). And, such connector portions 12a, 13a are connected to the associated tabs 20, 20' using ultrasonic welding or the like.

By the way, in such a unit cell 10, polymer films P are disposed between the positive electrode tab 20 and the outer sheath film 60 and between the negative electrode tab 20' and the outer sheath film 60. More particularly, such a polymer layer P is formed in a way such that, first, resin is welded to the positive electrode tab 20 and the negative electrode tab 20', respectively, and, thereafter, resin is also welded to the outer sheath film 60 when the outer sheath film 60 is thermally welded to allow peripheries of the tabs 20, 20' to be air-tightly sealed. Of course, formation of the polymer layer P is not limited to such a method, and it is not objectionable for the polymer P to be formed in such a way that, when thermally welding the outer sheath films 60 to allow the peripheries of the tabs 20, 20' to be air-tightly sealed after winding respective resin films onto the positive electrode tab 20 and the negative electrode tab 20', simultaneously, the polymer films are welded to the associated tabs 20, 20' and the outer sheath films 60.

With such a structure set forth above, a mass spring model focusing attention on the unit cell of the battery of the presently filed embodiment is schematically shown in FIG. 5.

As shown in FIG. 5, it is conceivable for a mass spring system of the unit cell 10 in such a mass spring model to form a multiple-freedom-degree system, with at least equal to or more than two degrees of freedom. The mass spring model of the multiple-freedom-degree system is comprised of a mass spring system S (involving a mass M, a spring constant K and a damping constant C) of the main body (mainly formed by a portion of the laminate outer sheath film 60 and the electric power generating element comprised of the positive-electrode current collectors 12, the separators 14 and the negative-electrode current collectors 13 that are sequentially stacked) of the unit cell 10 encompassed in the outer sheath film 60, a pseudo mass spring system Sa (involving a mass Ma and a spring constant Ka) which is conceived to be substantially formed of the tab 20, by which the main body of the unit cell 10 is structurally supported from outside on one hand, and the polymer layer P by which the tab 20 and the main body of the unit cell 10 are connected to one another, and a pseudo mass spring system Sb (involving a mass Mb and a spring constant Kb) which is conceived to be substantially formed of the tab 20', by which the main body of the unit cell 10 is structurally supported from outside on one hand, and the polymer layer P by which the tab 20' and the main body of the unit cell 10 are connected to one another. Here, the degree of freedom in the mass spring system typically corresponds to a number of pieces of masses that can be preset in the mass spring system and, in such a structure, more particularly in FIG. 5, there are three pieces of degrees of freedom. Also, the pseudo mass spring system means a mass spring system wherein clear mass portions can not be distinguishable from the associated components. Also, if the degree of freedom in presetting the mass includes at least more than two degrees of freedom, the mass spring system of the unit cell 10 and, in its turn, the spring mass system of the battery 100 can be suitably adjusted, thereby enabling an associated resonant frequency to be appropriately tuned in a manner as will be described below in detail. However, it is not objectionable for the other parameters, such as the spring constant and the damping constant, to be suitably preset to appropriately adjust the mass spring system of the unit cell 10.

Figure 6A:
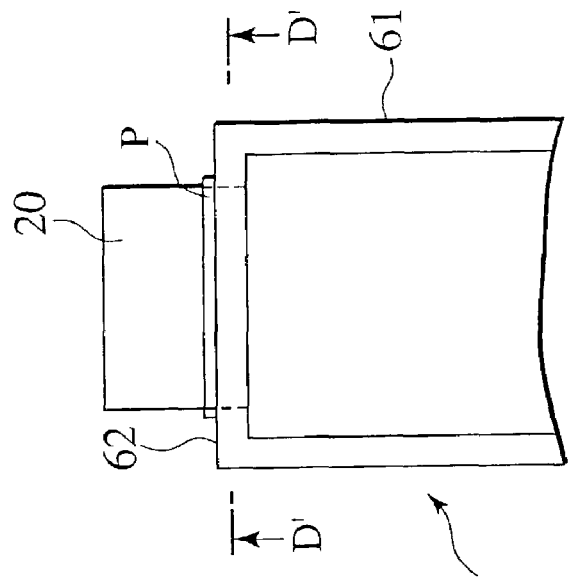
FIG. 6A is a plan view of a partial unit cell with a tab in a narrow tab width, in the embodiment.
Figure 6C:
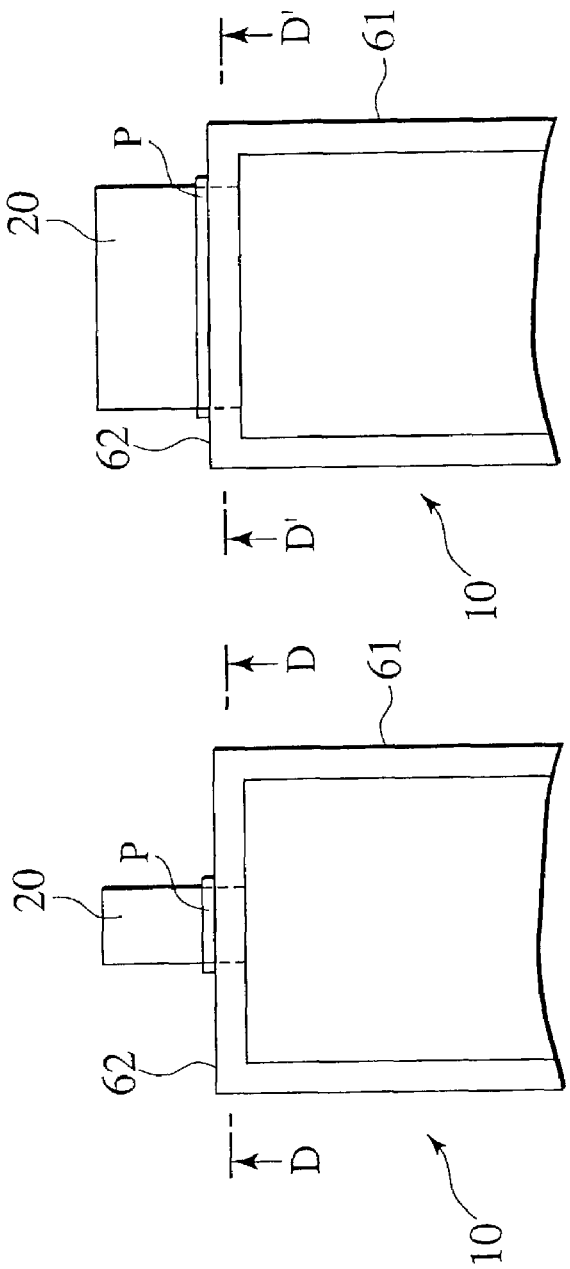
FIG. 6C is a plan view of a partial unit cell with a tab in a wide tab width, in the embodiment.
Figure 6B:
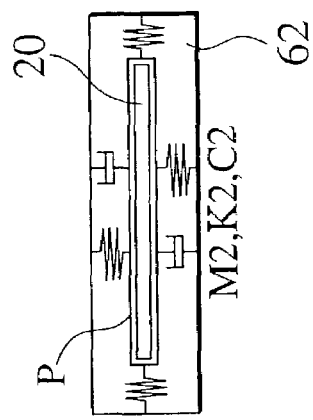
FIG. 6B is a cross sectional view taken on line D-D of FIG. 6A, in the embodiment.
Figure 6D:
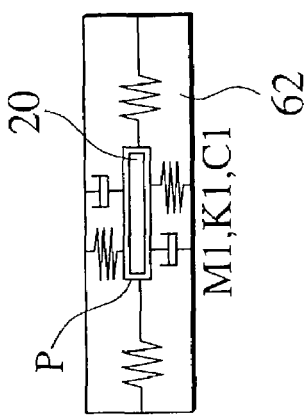
FIG. 6D is a cross sectional view taken on line D'-D' of FIG. 6C, in the embodiment.

As shown in FIG. 6A and FIG. 6B that is the cross sectional view taken on line D-D of FIG. 6A, and FIG. 6C and FIG. 6D that is the cross sectional view taken on line D'-D' of FIG. 6C, further, when looking at such situations in connection with two unit cells 10 different from one another in a width typically of the tab 20, it is general for any of the mass M2, the spring constant K2 and the damping constant C2 (see FIGS. 6C and 6D) of the unit cell 10 having the tab 20 with an increased width to be larger than the mass M, the spring constant K1 and the damping constant C1 (see FIGS. 6A and 6B) of the unit cell 10 having the tab 20 with a decreased width, respectively. This is due to the fact that, if the tab 20 has the increased width, the mass per se increases as a matter of course and a general thermally welded portion 62, corresponding to an area where the laminate outer sheaths 60 are mutually thermally welded in the thermally welded portion 61 in the absence of the tab 20, becomes small, the spring constant and the damping constant tend to increase. Of course, such circumstances are similarly shown as to the tab 20'.

That is, in the unit cell case composed of a metallic can or a resin case, since the case per se has an increased rigidity, it becomes hard for such a component to suitably adjust the mass spring system and, on the contrary, the presently filed embodiment features the provision of the unit cell 10 formed in the laminate outer sheath 60 to entirely allow the unit cell 10 to have a characteristic of a resilient body and has a capability of structuring the unit cell 10 having a whole of the mass spring system where the mass spring system formed by the outer sheath film 60 of the unit cell 10 and the electric power generating elements 12, 13, 14 and, in addition thereto, the pseudo mass spring systems formed by the tabs 20, 20', which are connected to the outer side of the unit cell 10 to receive vibrations, and their associated circumferential portions are connected in series.

With such a structure, since the outer wall composed of the outer sheath film 60 includes the polymer film such as nylon, the unit cell 10 has a lower dynamic spring constant than that of the rigid unit cell can, made of the metallic can or the resin case in the first place, and an increased efficiency in reducing vibrations and, in addition thereto, the circumferential peripheries of the tabs 20, 20' are also surrounded by the polymer layers P, resulting in a capability of freely presetting the mass spring system of the entire unit cell 10 and, in its turn, the whole of the battery 100.

From the foregoing description, it appears that in the presently filed embodiment, there is a need for the unit cell 10 forming the battery 100 to firstly employ an outer sheath with a low rigidity such as the outer sheath film 60 made of the polymer-metal composite material. This is due to a prerequisite required for realizing the mass spring system in the main body of the unit cell 10. And, with such a structure, appropriately presetting the mass spring system of the main body of the unit cell 10 and the pseudo mass spring system formed in the presence of the tabs 20, 20' provided with the polymer layers P allows the mass spring system of a whole of the unit cell 10 to be suitably preset.

Here, in order for preventing a vibrating energy from being transferred to the unit cell 10 as low as possible, it is vital to prevent resonant vibration of the unit cell 10 and the battery 100. However, since it is impossible to perfectly remove such a resonant vibration, the presence of the unit cell 10 with the resonant frequency deviated from a frequency range, which can occur in an actual practice under a circumference where the battery 100 is actually used, results in a capability of remarkably improving the anti-vibration effect (e.g., a primary resonant frequency, i.e., the first order resonant frequency is to be sifted to one of equal to or more than 200 Hz). FIG. 7 shows how a shift occurs in such a primary resonant frequency. FIG. 7 designates a frequency (Hz) on an abscissa axis and a vibration transfer rate (transmissibility) τ (dB) on an ordinate axis, with the anti-vibration property being kept preferable as the vibration transfer rate τ decreases. In the figure, a dotted line indicates vibration transfer rate characteristic of the unit cell having the rigid unit cell case with no suitably preset mass spring system, and a solid line designates a vibration transfer rate characteristic of the unit cell of the presently filed embodiment with suitably preset mass spring system. Referring to FIG. 7, it appears that a shift occurs in the vibration transfer rate of the unit cell of the presently filed embodiment with the suitably preset mass spring system, as compared to the vibration transfer rate of the unit cell having the rigid unit cell case with no suitably preset mass spring system, to permit the primary resonant frequency to shift a high frequency range, that is, from f0 to f1.

Also, in the structure of the presently filed embodiment, it is preferably need for the respective positive-electrode current collectors 12 that they are connected to the single positive electrode tab 20, and it is preferably need for the respective negative-electrode current collectors 13 that they are connected to the single negative electrode tab 20'. Although in case of forming only the unit cell 10, there is no adverse affect on the vibration absorption property even if the respective current collectors are connected to a plurality of positive electrode tabs and a plurality of negative electrode tabs, in case of forming the battery 100, if the respective current collectors are connected to a plurality of positive electrode tabs and a plurality of negative electrode tabs, it is considerable that the series-connected mass spring systems and the parallel-connected mass spring systems are probably mingled, and thus a high probability results in an entire non-uniform mass spring system to provide an unfavorable result in terms of the vibration absorption structure.

By the way, to study the polymer layer P of the presently filed embodiment more in detail, the tabs 20, 20' protrude outward from an interior of the unit cell 10 through sealed portions of the outer sheath film 60 and, hence, the polymer layers P must be present at boundary areas between the tabs 20, 20' and the outer sheath film 60. Thus, in the first place, fundamental structures of those areas per se where the tabs 20, 20' protrude from the main body of the unit cell 10 need to take the form shown in FIG. 8A, which is a plan view of the unit cell 10 with the polymer layer P being omitted, FIG. 8B, which is the side view of FIG. 8A, and FIG. 8C, which shows the cross section taken on line E-E of FIG. 8A. Also, in FIG. 8A, a width (tab width) of each of the tabs 20, 20' is equally designated by Wt, a width (current collector width) of each of the current collectors 12, 13 is equally designated by Wc and a width (unit cell width) of the unit cell is designated by Wb (similarly designated hereinafter). Besides, of course, the width Wb of the unit cell is equivalent to a width of the outer sheath film 60.

And, in such a structure, the polymer layers P are located in a way as shown in FIG. 9A, which is the plan view of the unit cell 10, and FIG. 9B that is the cross sectional view taken on line F-F of FIG. 9A, thereby obtaining the unit cell 10. With such a structure, among the welded portion 61 where the outer sheath films 60 are mutually welded and the tabs 20, 20' and the outer sheath films 60 are welded together, as shown in FIGS. 6B and 6D, the pseudo mass spring systems, each of which causes the vibrations from the tabs 20, 20' to be transferred to the unit cell 10 per se, are formed in areas where the tabs 20, 20' are sandwiched and areas of the general thermally welded portions 62 at the circumferences of the polymer layers P where the tabs 20, 20' are not sandwiched. Further, it becomes improper to use material, composed of metal that is hard to contribute to formation of the pseudo mass spring system, in the boundary areas between the tabs 20, 20' and the outer sheath films 60. Also, in FIG. 9B, the connector portions 12a of the positive-electrode current collectors 12 are shown to be formed by bending the positive-electrode current collectors 12 each as a single piece, and the connector portions 13a of the negative-electrode current collectors 13 are shown to be formed by bending the negative-electrode current collectors 13 each as a single piece. Also, reference symbol w designates the welded portions between the connector portions 12a, 13a and the tabs 20, 20'.

Hereinafter, the tab width Wt of the tabs 20, 20' to which such polymer layers P are applied is studied.

Figure 10:
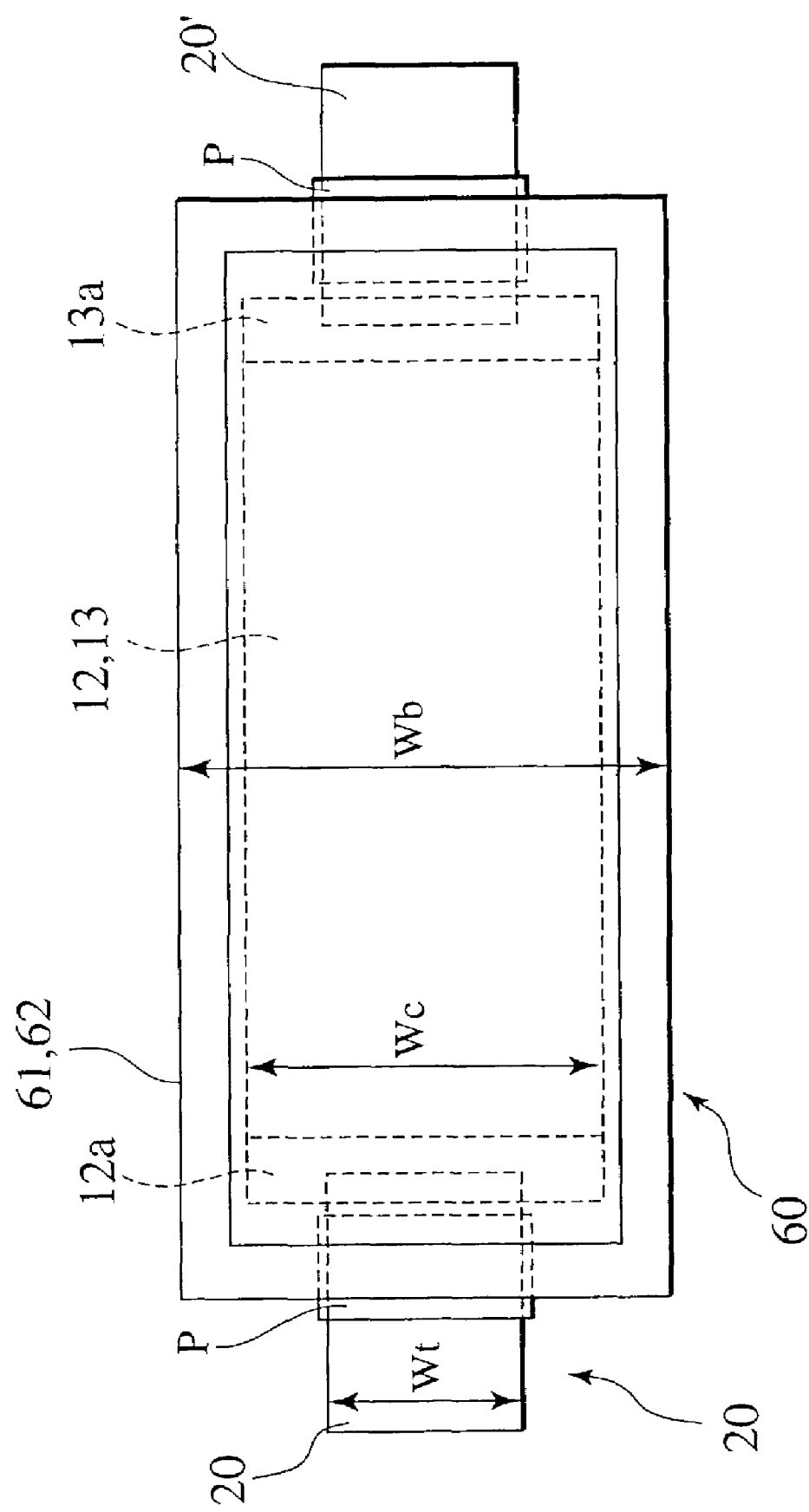
FIG. 10 is a plan view of the unit cell wherein the tab width Wt is determined with respect to the current collector width Wc, such that, although the tab width Wt is selected to be smaller than the current collector width Wc, a value (Wc−Wt) resulting from subtracting the width Wc of the tab from the current collector width Wc becomes equal to or less than the tab width Wt, and the polymer layer P is provided, in the embodiment.

In particular, the relationship between the current collector width Wc and the tab width Wt is preferable to fall in a condition in that a value (Wc−Wt) obtained by subtracting the tab width Wt from the current collector Wc is equal to or less than the tab width Wt (Wc−Wt≦Wt). That is, the tab width Wt may preferably fall in a value equal to or greater than a half of the current collector width Wc (Wt≧½ Wc). Also, in FIG. 9A, there is shown an example where the tab width Wt and the current collector width Wc are equal to one another and, in FIG. 10 that shows a modified form of the structure shown in FIG. 9A, a structure is shown wherein the tab width Wt is less than the current collector width Wc and a value (Wc−Wt) obtained by subtracting the tab width Wt from the current collector width Wc is maintained in a range equal to or less than the tab width Wt.

That is, since the tabs 20, 20', which serve as respective spring actions for supporting the mass of the unit cell 10, and the polymer films P, which are disposed at the circumferences of the tabs 20, 20' and also serve as respective spring actions for supporting the mass of the unit cell 10, have increased spring constants in proportion to the surface areas of these components, the presence of the tabs with the width Wt as large as possible enables a structure to be formed which has an excellent vibration absorption property. Consequently, as a difference between the current collector width Wc and the tab width Wt becomes greater than the tab width Wt (Wt<½ Wc), a contribution ratio of the tab width Wt becomes less than that of the mass spring system of the unit cell 10 and, so, it becomes hard to effectively support the unit cell 10, resulting in an unfavorable phenomenon as a vibration absorption structure.

Specifically, while the structure shown in FIGS. 6A and 6B forms an example, where the tab width Wt is 15% of the current collector width Wc (Wt/Wc=0.15), and the structure shown in FIGS. 6C and 6D forms an example where the tab width Wt is 75% of the current collector width Wc (Wt/Wc=0.75), it can be said that the structure shown in FIGS. 6C and 6D has a more appropriate vibration absorption structure.

Here, in the presently filed embodiment, the other exemplary structure of the unit cell 10, in which the ratio between the tab width Wt and the current collector width Wc is suitably preset, is shown in FIGS. 11A to 14B.

Figure 12A:
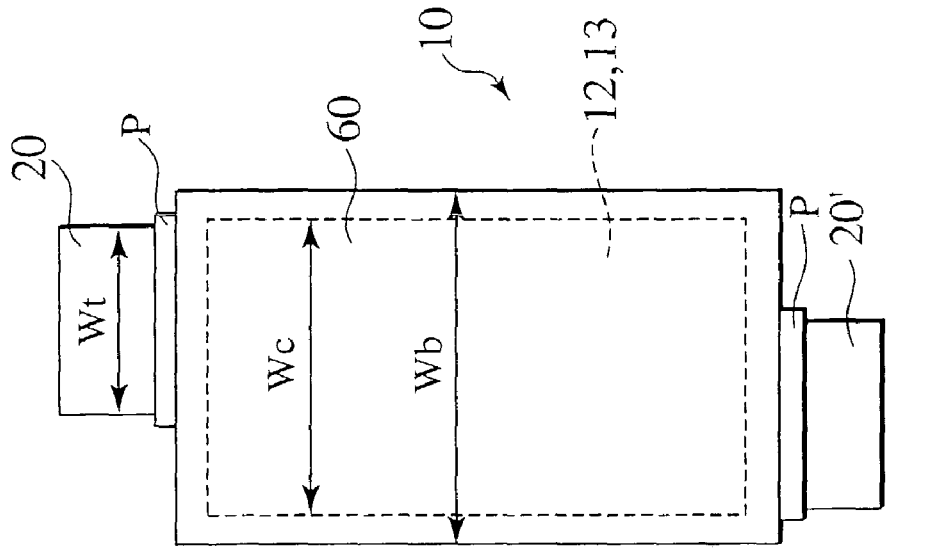
FIG. 12A is a plan view of the unit cell wherein the tabs protrude from the short sides of the unit cell at respective positions deviated leftward in the figure and the ratio (Wt/Wc) falls in a value of 0.6, in the embodiment.
Figure 12B:
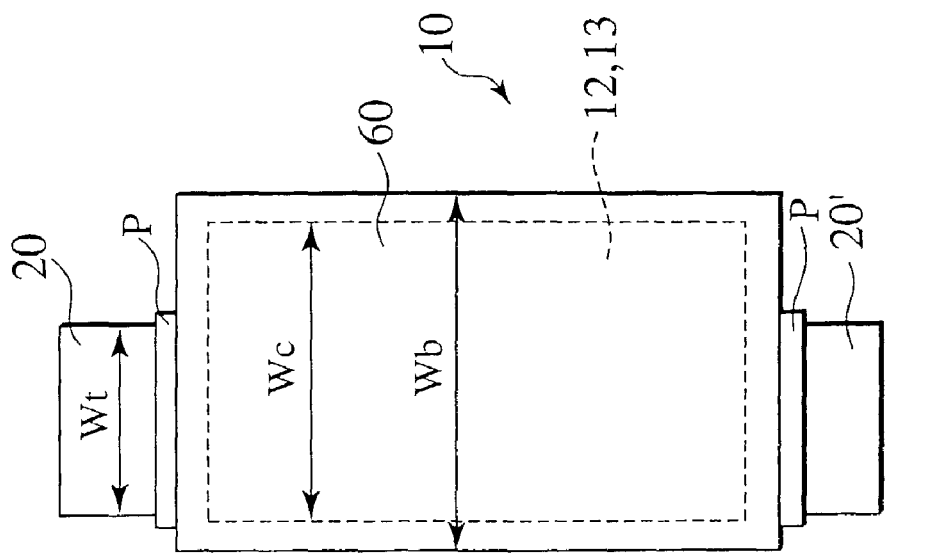
FIG. 12B is a plan view of the unit cell wherein one of the tabs protruding from the short side of the unit cell is deviated rightward in the figure whereas the other one of the tabs protruding from the short side of the unit cell is deviated leftward in the figure, and the ratio (Wt/Wc) falls in a value of 0.6, in the embodiment.
Figure 13A:
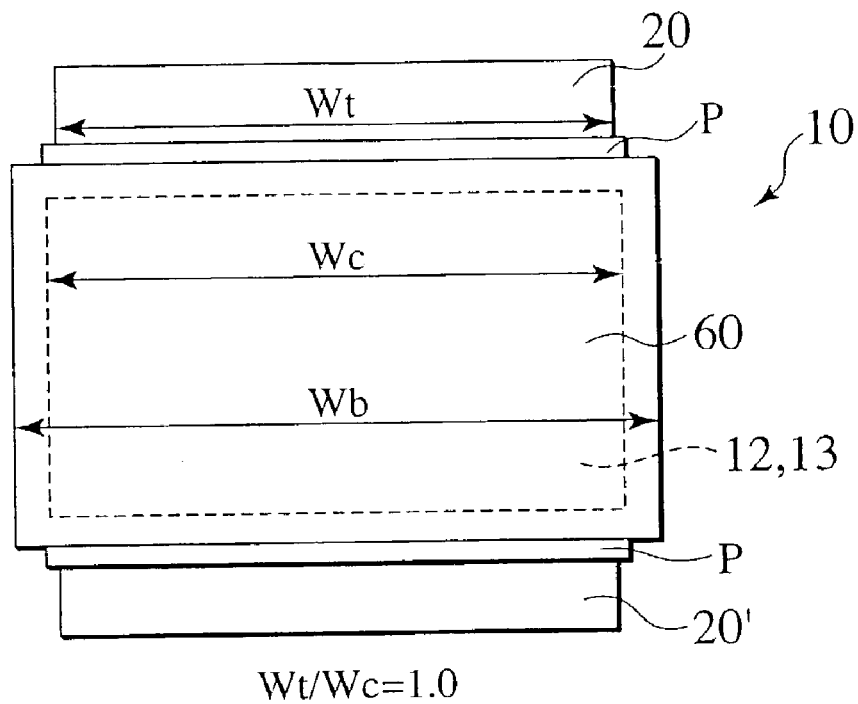
FIG. 13A is a plan view of the unit cell wherein the tabs protrude from long sides of the unit cell formed in the rectangular shape and the ratio (Wt/Wc) falls in a value of 1.0, in the embodiment.
Figure 13B:
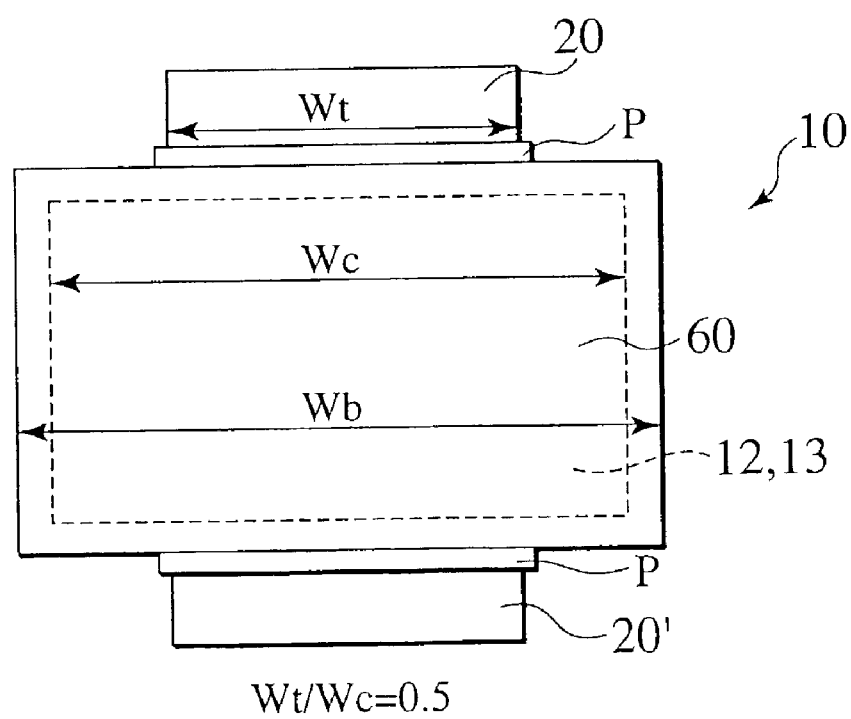
FIG. 13B is a plan view of the unit cell wherein the ratio (Wt/Wc) falls in a value of 0.5, in the embodiment.
Figure 14A:
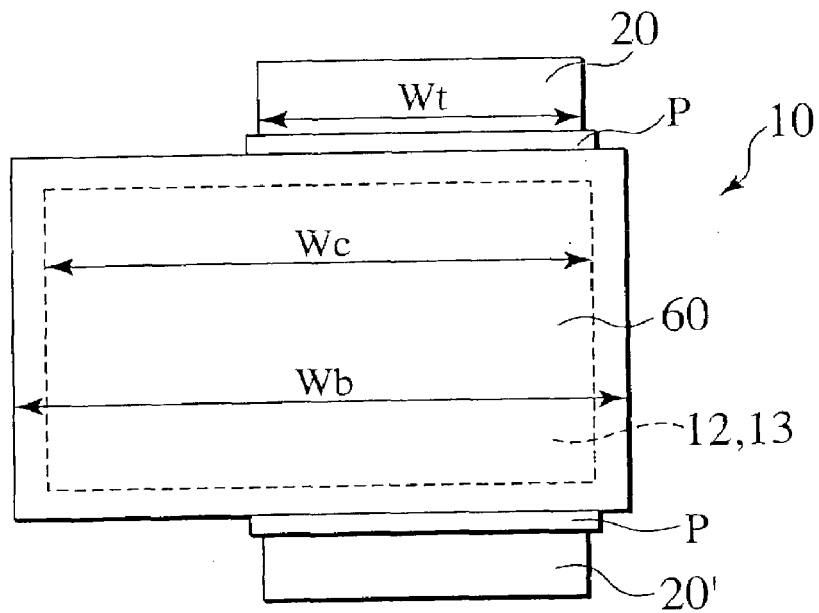
FIG. 14A is a plan view of the unit cell wherein both the tabs protrude from long sides of the unit cell at respective positions deviated rightward in the figure and the ratio (Wt/Wc) falls in a value of 0.6, in the embodiment.
Figure 14B:
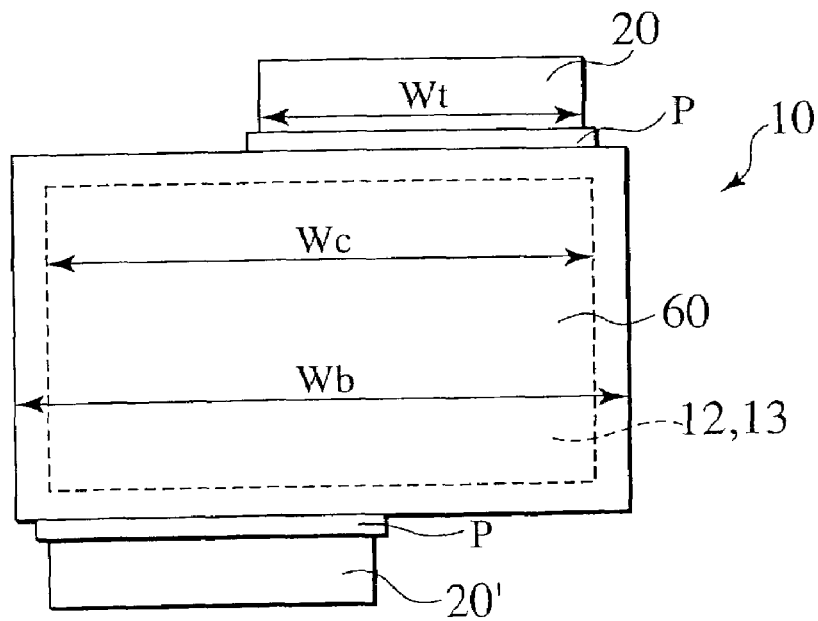
FIG. 14B is a plan view of the unit cell wherein one of the tabs protruding from the long side of the unit cell is deviated rightward in the figure whereas the other one of the tabs protruding from the long side of the unit cell is deviated leftward in the figure, and the ratio (Wt/Wc) falls in a value of 0.6, in the embodiment.

FIGS. 11A to 14B show plan views of the unit cells formed in various relationships between the tab width Wt and the current collector width Wc, respectively, FIG. 11A shows a case where Wt/Wc=1.0, FIG. 11B shows a case where Wt/Wc=0.75, FIG. 11C shows a case where Wt/Wc=0.5, any of FIGS. 12A and 12B show cases where Wt/Wc=0.6, FIG. 13A shows a case where Wt/Wc=1.0, FIG. 13B shows a case where Wt/Wc=0.5 and any of FIGS. 14A and 14B show cases where Wt/Wc=0.6. However, in FIGS. 11A to 11C, the tabs 20, 20' protrude at the short sides of the respective unit cells 10, each formed in the rectangular shape, that is, at the short side of the current collector 12 (13) and at the short side of the outer sheath film 60, and in FIG. 12A, both the tabs 20, 20' disposed at the respective short sides of the unit cells 10 protrude at respective positions deviated leftward in the figure whereas, in FIG. 12B, the tab 20 disposed at the short side of the unit cell 10 protrudes at a position deviated rightward in the figure and the tab 20' disposed at the short side of the unit cell 10 protrudes at a position deviated leftward in the figure. Also, in FIGS. 13A and 13B, the tabs 20, 20' protrude at long sides of the respective unit cells 10, each formed in the rectangular shape, that is, at long sides of the current collector 12 (13) and the outer sheath film 60, and in FIG. 14A, both the tabs 20, 20' located at the long sides of the unit cells 10 protrude at respective positions deviated rightward in the figure whereas, in FIG. 14B, the tab 20 located at the long side of the unit cell 10 protrudes at a position deviated rightward in the figure and the tab 20' located at the other long side of the unit cell 10 protrudes at a position deviated leftward in the figure.

With such structures, if a difference between the current collector width Wc and the tad width Wt is equal to or less than the tab width Wt (Wt≧½ Wc), a contribution ratio of the tab width Wt becomes higher than the mass spring system of the unit cell 10 to enable the unit cell 10 to be effectively supported, resulting in a favorable vibration absorption structure.

Still also, to study the relationship between the tab width Wt and the cell width Wb, the tab width Wt of each of tabs 20, 20' protruding outward from the outer sheath film 60 of the unit cell 10 may preferably fall in a value equal to or greater than 30% and equal to or less than 80% ($0.3 \leq$ Wt/Wb$\leq 0.8$) of a length of the side of the outer sheath film 60, from which the tabs 20, 20' protrude, that is, the cell width Wb. That is to say, if the relationship between the tab width Wt and the cell width Wb falls in such a range, since vibrations transferred from the tabs 20, 20' are substantially uniformly transferred to the current collector 12, 13, vibration eliminating effect more increases.

Furthermore, with respect to heat developments in the tabs 20, 20' that are to be considered when flowing a large current, the tab width Wt may preferably have a value as large as possible. Additionally, in order to decrease internal resistance of the unit cell 10, the tab width Wt may preferably have the value as large as possible. Accordingly, from such view points of the heat and the resistance, the tab width Wt is not specifically limited.

Still also, cross sectional areas of the tabs 20, 20' are studied below.

Figure 15:
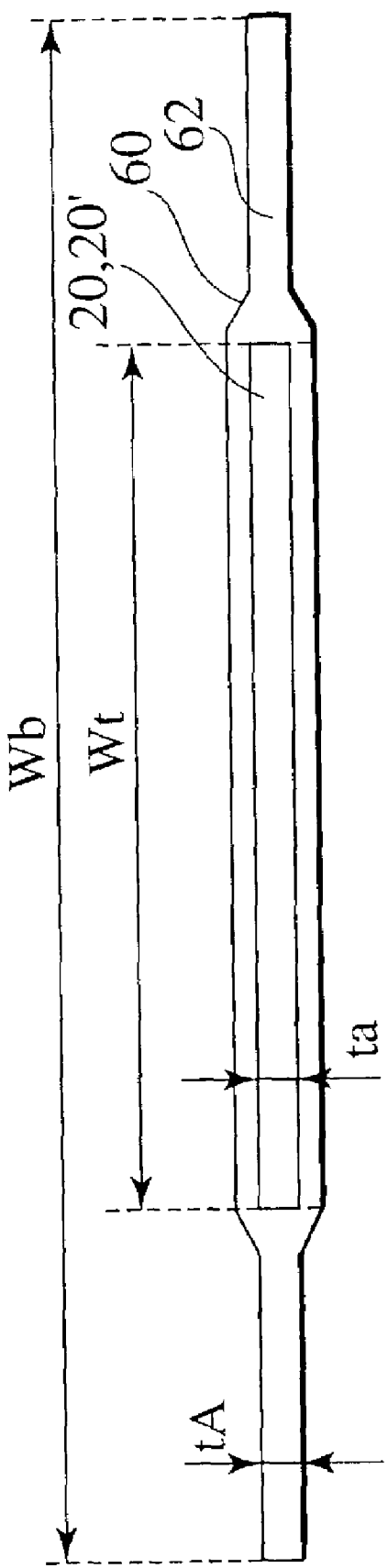
FIG. 15 is a cross sectional view of the unit cell, related to sides of an outer sheath film from which the tabs protrude, for illustrating the cross sectional area of a general welded portion, in the embodiment.

In particular, as shown in FIG. 15 that is a cross sectional view of the unit cell having sides, from which the tabs 20, 20' protrude, of the outer sheath film 60, it is preferable for the cross sectional area St of the tabs 20, 20', in the cross sections of the sides, from which the tabs 20, 20' protrude, of the outer sheath film 60, to be equal to or less than the cross sectional area (cross sectional area Sg of the general welded portion 62) resulting from subtracting the cross sectional area St of the tab from a whole cross sectional area S of the sides involving the cross sectional area of the tab (St$\leq$S−St=Sg). Here, the cross sectional area Sg of the general welded portion 62, except for the cross sectional area of the tab, in one side of the outer sheath film 60 from which the tabs 20, 20' protrude is meant by the cross sectional area (tA×Wb) resulting from multiplication between a thickness tA of the general welded portion at the sides thereof, from which the tabs protrude, and a width (cell width) Wb at the sides of the outer sheath films, from which the tabs protrude, as shown in FIG. 15. That is, the cross sectional area Sg corresponds to the original cross sectional area of the welded portion 61 that does not involve the cross sectional area widened by a thickness ta of the tab while sandwiching the tab, which has the width Wt.

That is, if the cross sectional area St (ta×Wt) of the tab becomes greater than the cross sectional area Sg (ta×Wb) of the general welded portion, although the rigidity that supports the mass of the unit cell can be sufficiently enhanced, the spring constant of the tab becomes too large and the vibration from the tab is apt to be easily and directly transferred to the unit cell body, providing an improper vibration absorption structure. Consequently, the cross sectional area St of the tab may preferably fall in a value equal to or less than the cross sectional area Sg of the general welded portion 62.

Figure 16A:
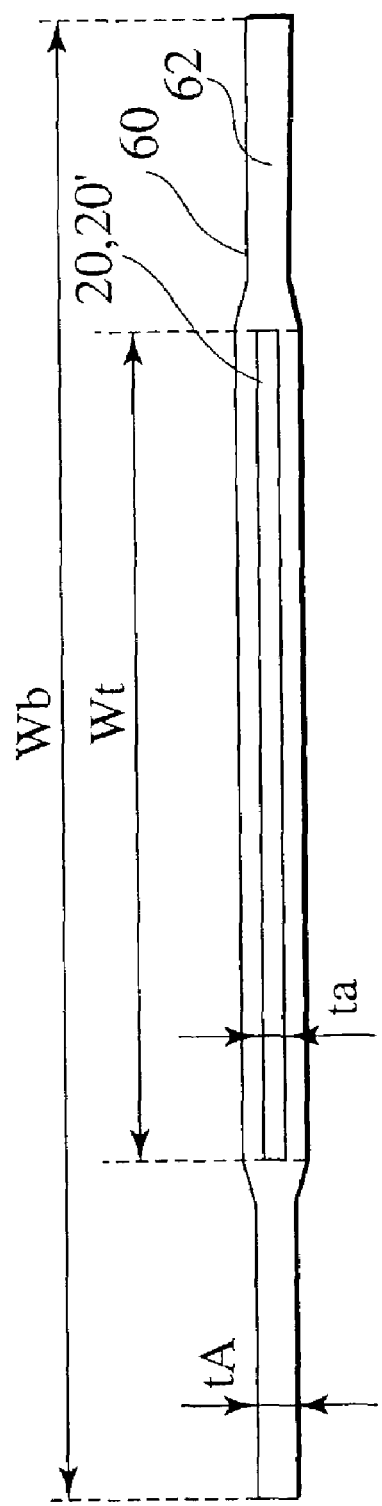
FIG. 16A is a cross sectional view of the unit cell, related to sides of an outer sheath film from which the tabs protrude, wherein a cross sectional area of the tab is selected be relatively small, in the embodiment.
Figure 16B:
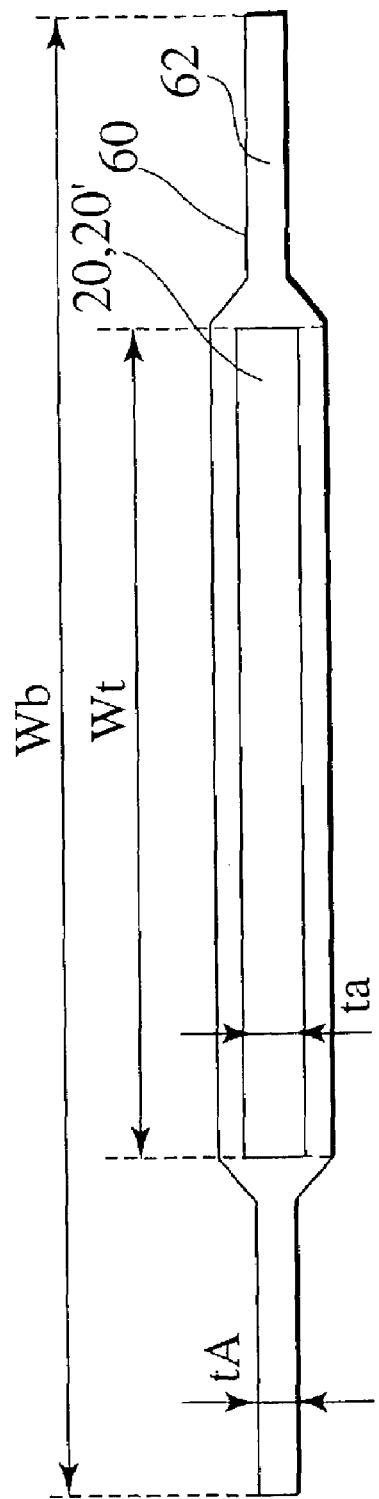
FIG. 16B is a cross sectional view of the unit cell, related to sides of an outer sheath film from which the tabs protrude, wherein a cross sectional area of the tab is selected be relatively large, in the embodiment.

Specifically, in FIG. 16A, which is a cross sectional view of the unit cell having the outer sheath film 60 from which the tabs 20, 20' protrude, if the cross sectional area of the tabs 20, 20' is St (ta×Wt, ta=200 μm, Wt=50 mm) in terms of the cross sectional area Sg (tA×Wb, tA=250 μm, Wb=100 mm) of the general welded portion 62, a formula St<Sg is satisfied and a resulting vibration absorption structure falls in a preferable range. In contrast, in FIG. 16B that is a cross sectional view of another structure of the unit cell having the outer sheath film 60 from which the tabs 20, 20' protrude, if the cross sectional area is St (ta×Wt, ta=550 μm, Wt=50 mm) in terms of the cross sectional area Sg (tA×Wb, tA=250 μm, Wb=100 mm), a formula St> Sg is satisfied and a resulting vibration absorption structure becomes improper in performance.

Incidentally, as already mentioned, with respect to heat developments in the tabs 20, 20' that are to be considered when flowing a large current, the tab cross sectional area St may preferably have a value as large as possible. Additionally, in order to decrease internal resistance of the unit cell 10, the tab cross sectional area Wt may preferably have the value as large as possible. Accordingly, from such view points, the tab cross sectional area St is not specifically limited.

By the way, as set forth above, in the presently filed embodiment, the presence of the fundamental structure thus defined in such a manner enables an excellent vibration absorption effect to be provided in principle. And, in addition, by adding other limited items, the resonant frequency of the unit cell shown in FIG. 7 can be shifted to a more arbitrary frequency range. Namely, it becomes possible to shift an undesirable primary resonant frequency (first order resonant frequency) of the unit cell to a high frequency range.

For example, if case of a vehicle installed with the unit cell of this kind, although resonant vibration of the battery originally occurs to result in an increased probability of promoting degradation, caused by vibrations, such as fatigue of the tab portions of the battery at the frequency range (of a value less than 200 Hz) appearing on the vehicle, an ability of such a frequency shift enables the resonant frequency to be shifted to a frequency (of a value equal to or more than 200 Hz) exceeding the frequency range that causes vibrations on the vehicle and, therefore, the vibration absorption performances of the unit cell and the battery using such unit cell can be reliably improved.

From the standpoint of such a frequency shift, it is desired for the cross sectional area St of each of the tabs 20, 20' protruding from the outer sheath film 60 of the unit cell 10 to fall in a range equal to or greater than 5% and equal to or less than 70% ($0.05 \leq$ St/Sg$\leq 0.7$) of the cross sectional area Sg of the general welded portion of the sides of the outer sheath film 60 from which the tabs protrude. That is to say, at a value less than 5%, the spring constant becomes too small and it is a probable for the rigidity for supporting the unit cell 10 to be lowered. Additionally, as a result of an increase in resistance of each of the tabs 20, 20', the temperatures of the tabs 20, 20' increase when used in a large electric current. On the other hand, further, at a value of greater than 70%, the spring constant increases, thereby causing an inability to effectuate a shift in a high frequency range.

Further, from the standpoint of such a frequency shift, it is preferable for the thickness ta of each of the tabs 20, 20' protruding from the outer sheath film 60 of the unit cell 10 to fall in a range equal to or greater than 20% and equal to or less than 80% ($0.02 \leq$ ta/tA$\leq 0.8$) of the thickness tA of the general welded portion of the sides of the outer sheath film 60 from which the tabs protrude. That is to say, at a value less than 20%, the rigidities of the tabs 20, 20' become small and it is highly probable for the tabs to be hard to support the main body of the unit cell 10. On the other hand, at a value of greater than 80%, the spring constant increases, thereby causing an inability to effectuate a shift in a high frequency range.

Figures 17A, 17B:
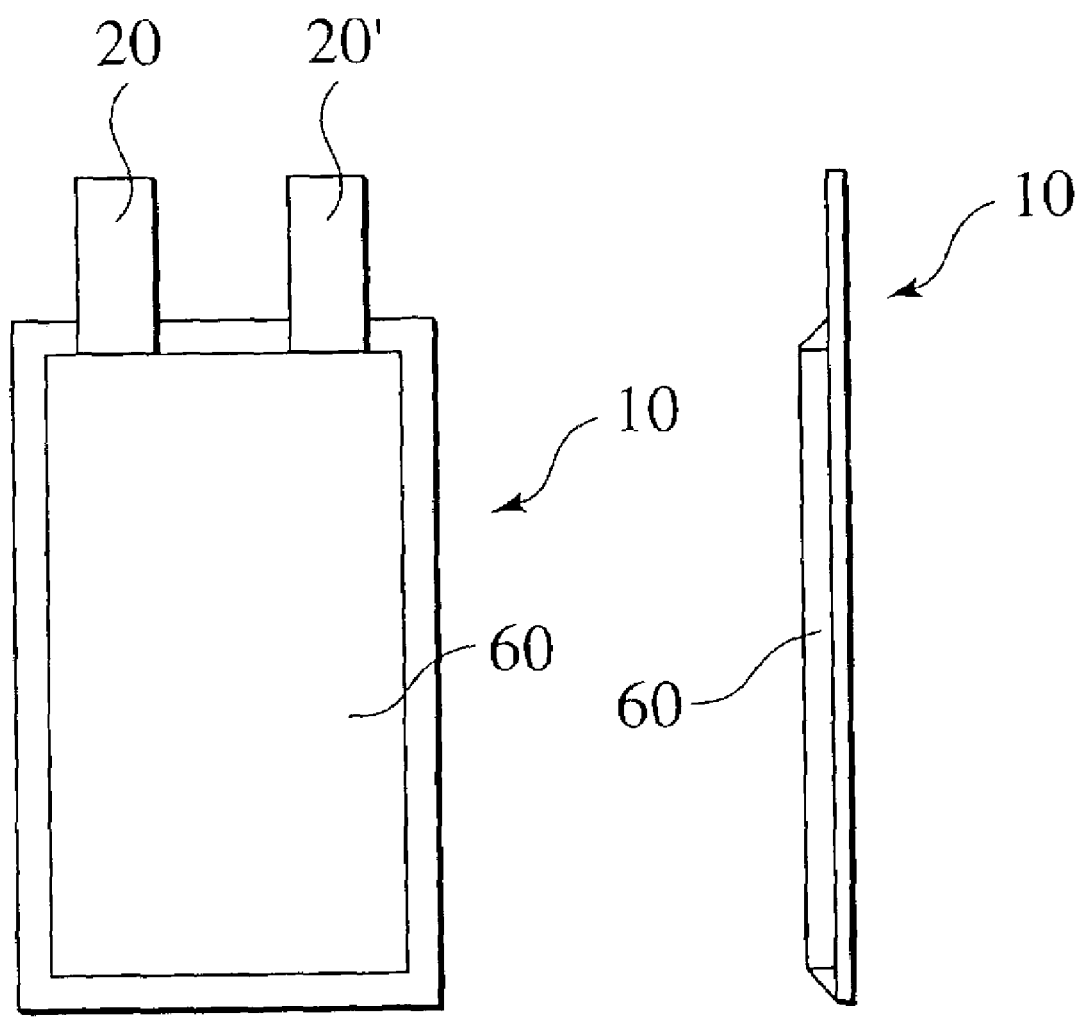
FIG. 17A is a plan view of the unit cell having the outer sheath film formed with one side from which both the tabs protrude, in the embodiment.
FIG. 17B is a side view of the unit cell shown in FIG. 17A, in the embodiment.

Here, in the presently filed embodiment, as described hereinabove, in consideration of the vibration absorption characteristic and the frequency shift, it is preferred that the respective tabs 20, 20' protruding from the outer sheath film 60 of the unit cell 10 protrude at different sides of the outer sheath film 60, respectively. Of course, in general, as shown in FIGS. 17A and 17B, it is conceivable that the unit cell 10 with the laminate outer sheath concurrently has the positive and negative electrode tabs 20, 20' at one side of the outer sheath 60. However, when locating the unit cell with such a structure into the battery, the spring constant of the connection portion of the tab inevitably increases at a point where the tab is connected to the lead wire or the like, and the connection portion of the tab forms a fixed end inside the battery. If vibrations enter such a structure, oscillation at a free end with no tab occurs at an increased rate and it is probable for metal fatigue to easily occur, resulting in accompanied deterioration in a vibration absorption performance. On the contrary, when placed in the battery, since the unit cell having the respective tabs at both ends of the cell allows vibrations to uniformly enter the tabs located at the both sides of the cell such that the metal fatigues of the tabs become hard to occur, it is concluded to be desirable for the respective tabs 20, 20' to protrude from the different sides of the outer sheath film 60, respectively. Also, even with such structures wherein central portions of the tabs 20, 20' are not aligned with central portions of the unit cells (see FIGS. 12A, 12B, 14A and 14B), although improvement in the vibration absorption performance and the frequency shift can be attained in principle, it is preferred that, in order to effectively realize such functions, the centers of the tabs 20, 20' are substantially overlapped with the centers of the unit cells 10 (see FIGS. 11A to 11C and 13A to 13B).

Further, from the viewpoint of such frequency shift, it is preferable for the unit cell 10 to have a thickness (the maximum thickness tB in FIG. 3) in a range equal to or greater than 1 mm and equal to or less than 10 mm. That is to say, while the spring constant of the unit cell 10 is determined by Young's modulus of the whole of the unit cell 10, if the thickness of the unit cell 10 is too large, then the spring constant decreases and a difficulty is caused in effectuating the frequency shift. Additionally, if the thickness of the unit cell 10 exceeds a value of 10 mm, the heat tends to build up inside the unit cell, resulting in an increased probability of occurrence in an increase in heat deterioration. On the contrary, if the thickness of the unit cell 10 is less than 1 mm, the spring constant of the unit cell becomes extremely high, resulting in an inability of establishing a balance with respect to an exciting force. In addition, if the unit cell 10 has the thickness less than 1 mm, an increased capacity of the unit cell cannot be attained even in the presence of the positive electrode layer and the negative electrode layer both of which are thin and, hence, it cannot be said that such a cell is economically efficient.

Figure 18C:
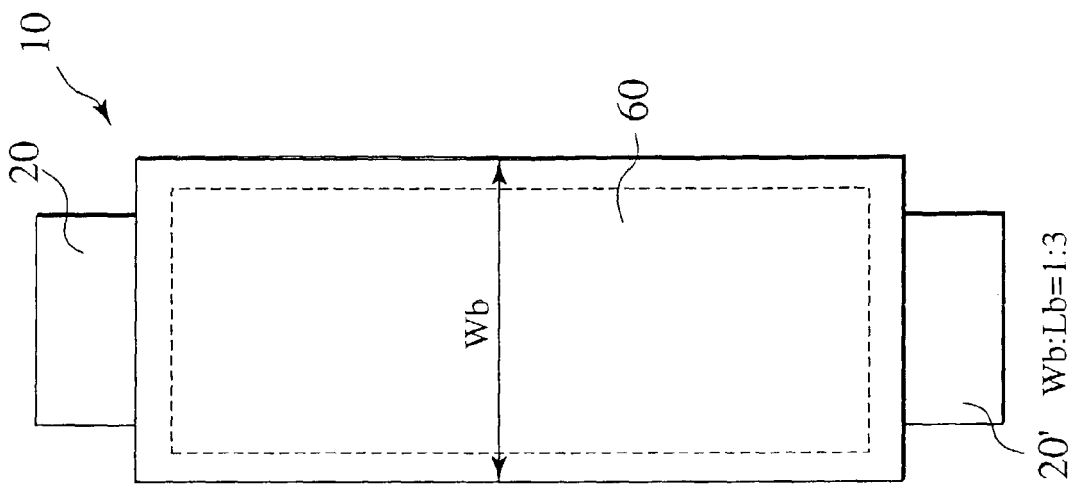
FIG. 18C is a plan view of the unit cell wherein the ratio (Wb:Lb) in length between two sides is selected to be 1:3, in the embodiment.
Figure 18B:
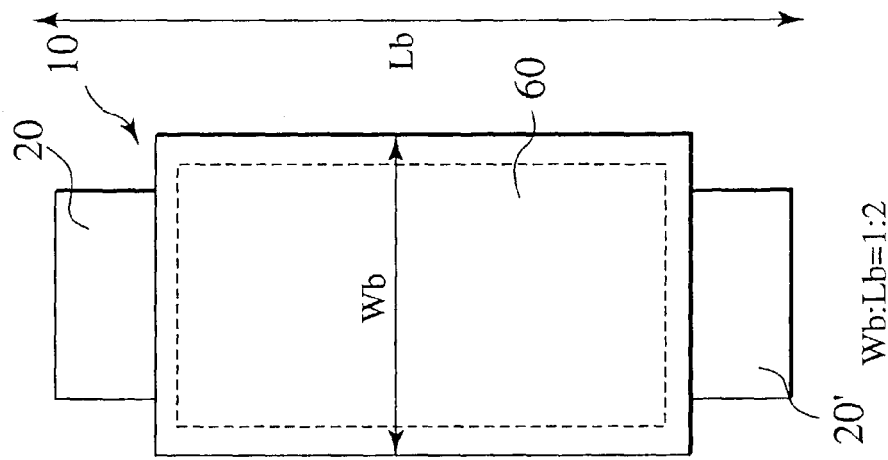
FIG. 18B is a plan view of the unit cell wherein the ratio (Wb:Lb) in length between two sides is selected to be 1:2, in the embodiment.
Figure 18A:
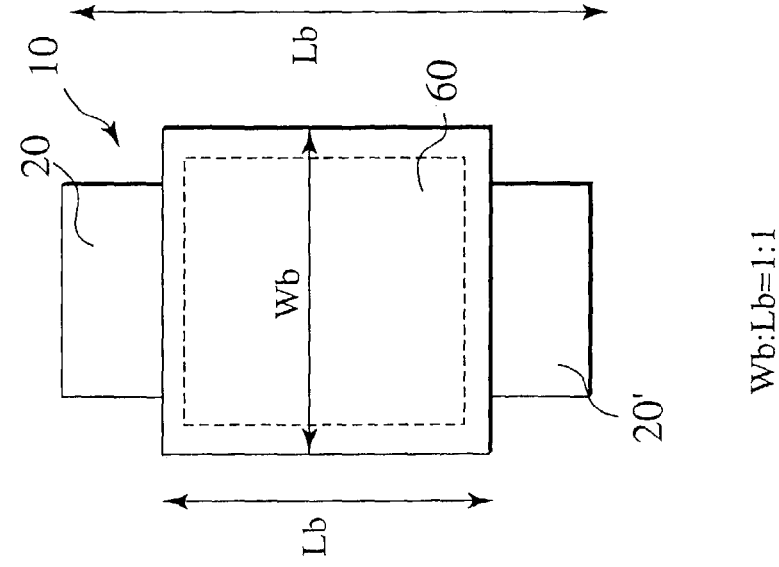
FIG. 18A is a plan view of the unit cell wherein a ratio (Wb:Lb) in length between two sides is selected to be 1:1, in the embodiment.

Furthermore, here, in the unit cell 10 formed in the rectangular shape like in the presently filed embodiment, as shown in FIGS. 18A to 18C, it is desirable for the ratio (Wb:Lb) in length between the two sides (except for the side in a thickness direction) to fall in a range from 1:1 to 1:3. That is to say, in order to effectively obtain the vibration absorption effect, the ratio (Wb:Lb) in length between the two sides of the unit cell 10 may be preferably equal to or closer to a value of 1:1 (see FIG. 18A), and if Lb relatively increases to progressively come off Wb, then a twist of the unit cell 10 progressively increases. And, if the ratio (Wb:Lb) in length between the two sides passes through a value of 1:2 (see FIG. 18B) and exceeds a value of 1:3 (FIG. 18C), the length of the unit cell 10 becomes too large with a resultant increase in an amplitude at a central portion of the unit cell 10 relative to the vibration that is inputted, and there is an increased probability of occurrence in an increase in the loads of the tabs 20, 20'. However, in case of the ratio (Wb:Lb) in length between the two sides falling in the value of 1:1, since the capacity of the unit cell decreases and the number of unit cells must be inevitably increased for the purpose of obtaining the battery with a large capacity, such a battery results in inferior cost performance. In consideration of such a standpoint, in an actual practice, it is optimum for the ratio (Wb:Lb) in length between the two sides to fall in a value of 1:2, but no limitation to such particular ratio is intended.

Now, materials for the unit cell 10 of the presently filed embodiment are described below in detail.

Material for the positive and negative electrode tabs 20, 20' of the unit cell 10 may be preferably selected from nickel (Ni), copper (Cu), aluminum (Al) and iron (Fe) or from an arbitrary combination of these elements. Since these materials are appropriate to provide sufficient rigidities to support the own weight of the unit cell 10 especially when these materials are formed in a thickness (from 50 to 300 μm) approximately equal to that of the tab, it is possible to cause the frequency shift to be easily realized.

Further, material for the polymer layer P may be preferably selected from polypropyrene (PP), modified PP, polyethylene (PE), modified PE and ionomer or from an arbitrary combination of these elements. Since these polymer materials form springs at the welded portions with the above-described tab metal and its spring constant is relatively closer to the spring constant of the unit cell, it is possible to cause the frequency shift to be easily realized.

Furthermore, the positive-electrode current collector 12 is made of material of Al, and the negative-electrode current collector 13 is made of material of Cu. These materials are used because of ease of matching in view of the vibration absorption characteristic between the positive electrode tab 20 and the negative electrode tab 20'.

Moreover, the positive-electrode current collector 12 is made of positive electrode material preferably selected from lithium (Li)-Manganese (Mn) series composite oxides, and the negative-electrode current collector 13 is made of negative electrode material preferably selected from crystalline carbon material (graphite) and non-crystalline carbon material (hard carbon) or from an arbitrary combination of these elements. Since these are raw materials to provide sufficiently large spring constants to the connecting portions of the unit cell 10, there is a less probability of causing oscillation inside the unit cell 10 and it becomes possible to eliminate the unit cell 10 from being suffered from vibrating deterioration. Also, on the contrary, although there is a probability of causing vibrations to be easily transferred to the tabs 20, 20', the presence of the frequency shift enables the resonant frequency to be shifted in an actual practice, with no adverse affect being caused in view of the vibration absorption characteristic.

Further, the separator 14 is possibly made of material preferably selected from PP single layer member, PE single layer member or a three-layer structured member wherein PP, PE and PP are sequentially laminated.

Furthermore, the outer sheath material 60 is composed of the heat resistant insulation resin film that is preferably selected from polyethylene terephthalate film (PET film: polyester film) and nylon film, the metallic film that includes an Al film, and the thermal-weld insulation resin film that is preferably selected from a PE film and a PP film.

Next, a battery using the unit cells of the structure set forth above is described below.

Figure 19A:
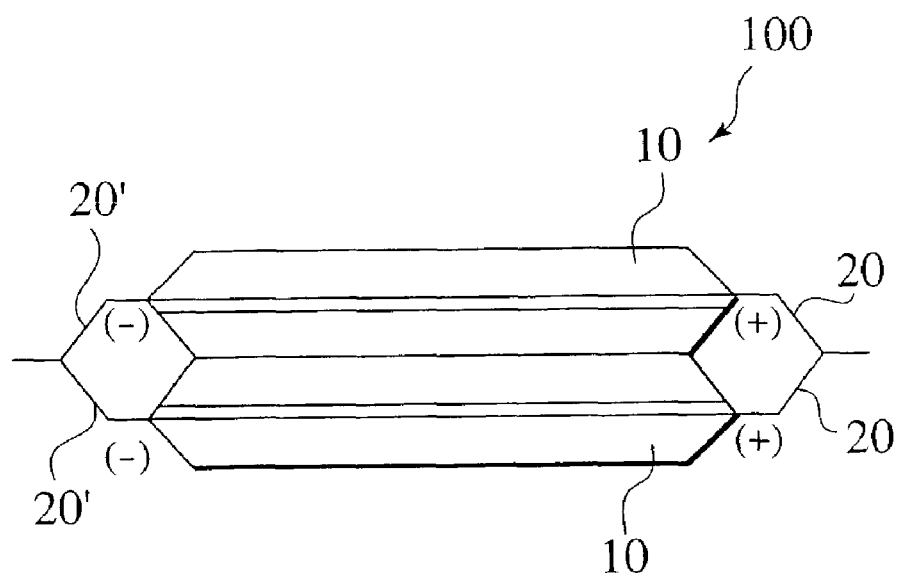
FIG. 19A is a plan view of the battery, which corresponds to FIG. 1C, having a plurality of unit cells which are connected in parallel, in the embodiment.
Figure 19B:
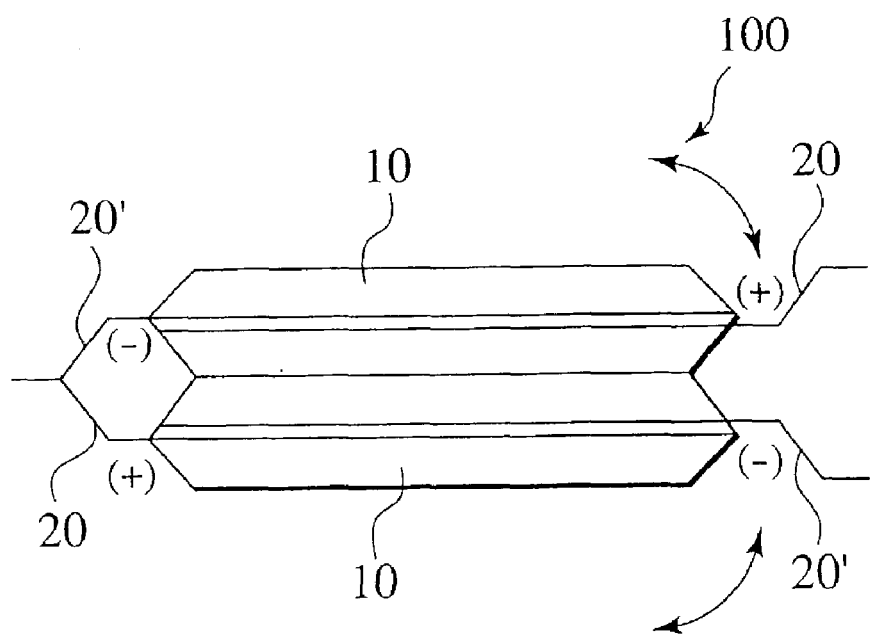
FIG. 19B is a plan view of the battery, which corresponds to FIG. 1C, having the plurality of unit cells which are connected in series, in the embodiment.

The battery of the presently filed embodiment may take a connecting structure of the type including at least one group composed of equal to or more than two unit cells 10, set forth above, the respective unit cells 10 are connected in parallel in a parallel-connected form in such a manner that the respective unit cells 10 are laminated and the same number of the positive electrode tabs 20 as the number of the unit cells connected in parallel and the same number of the negative electrode tabs 20' as the number of the unit cells connected in parallel are respectively welded. That is to say, in the parallel-connected form where the unit cells are placed in a laminates structure as shown in FIG. 19A as viewed from sides of respective unit cells 10 therein, since adjacent positive electrode tabs 20 are mutually welded to be connected to one another and, likewise, adjacent negative electrode tabs 20' are mutually welded to be connected to one another, stresses are exerted to the respective unit cells 10 in the same phase when subjected to vibrations inputted from outside, and there is a less probability for the respective unit cells 10 to be adversely affected by the twist forces. On the contrary, in a series-connected form of the unit cells 10 as shown in FIG. 19B as viewed from the sides of the respective unit cells 10 therein, since the positive electrode tab 20 and the negative electrode tab 20' are bounded to be connected to one another, the twist forces are apt to be easily exerted to the respective unit cells 10 as shown by arrows in the figure.

Further, the battery of the presently filed embodiment may take another connected form wherein the battery includes at least one group of at least two unit cells 10, set forth above, and the unit cells 10 are connected in parallel in a parallel-connected form in such a manner that the respective unit cells are juxtaposed to each other while aligning the sides thereof and also a plurality of positive electrode tabs 20 and a plurality of negative electrode tabs 20' are welded to respective common bus bars 30. That is to say, in the parallel-connected form of the unit cells 10 as shown in FIG. 20A as viewed from a top therein, since the adjacent positive electrode tabs 20 are mutually connected to one another and the adjacent negative electrode tabs 20' are mutually connected to one another, stresses are exerted to the respective unit cells 10 in the same phase when subjected to vibrations inputted from outside, and there is a less probability for the respective unit cells 10 to be adversely affected by the twist forces. On the contrary, in the series-connected form of the unit cells 10 as shown in FIG. 20B as viewed from a top therein, since the positive electrode tabs 20 and the negative electrode tabs 20' are bounded to be connected to one another, the twist forces are apt to be easily exerted to the respective unit cells 10 as shown by arrows in the figure.

Also, while it is most desirable for the connecting structures of these unit cells to be configured to allow all of the unit cells in the battery to be connected in parallel, the presence of at least one parallel connection in the battery enables reduction in probability for the unit cells 10 from being adversely affected by the twist forces.

Figure 21:
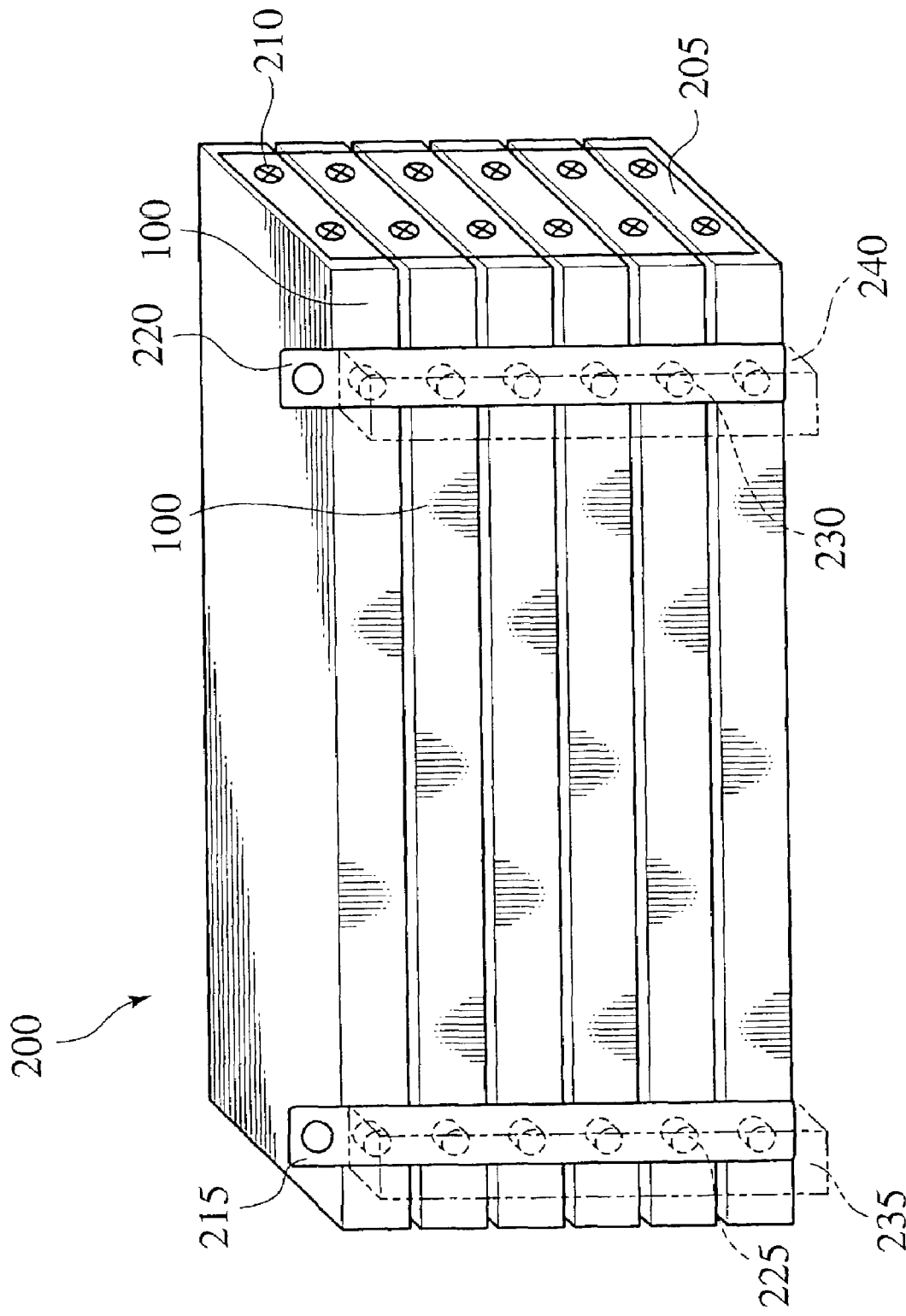
FIG. 21 is a perspective view of a composite battery, in the embodiment.

Further, by assembling equal to more than two batteries 100, set forth above, in a particular pattern involving the series-connected form, the parallel-connected form or a composite-connected form with series connection and parallel connection, it becomes possible to form a composite battery 200 shown in FIG. 21.

In order for the composite battery 200 to be formed as shown in FIG. 21, six sets of batteries 100, shown in FIG. 1, are connected in parallel and connecting plates 205, each having a plurality of openings associated with threaded bore portions (not shown), are fixedly secured by fixture screws 210 that are screwed into respective associated threaded bores formed on both sides of respective battery cases 50, thereby permitting the respective batteries 100 to be mutually connected to one another. On one hand, the positive terminals 51 and the negative terminals 52 of the batteries 100 disposed on lid bodies above the respective battery cases 50 are connected to an outer positive electrode terminal section 215 and an outer negative electrode terminal 220, respectively. And, further, positive electrode terminals 225 and negative electrode terminals 230 of the respective batteries 100 are covered with and protected by positive and negative electrode insulation covers 235, 240, respectively, and identified in suitable color identification such as red color and blue color, respectively.

The composite battery 200 with such a structure may be possibly formed in combination of the batteries in an appropriate capacity with a desired output voltage so as to comply with a purpose to be used. Of course, while it is possible to obtain a suitable capacity with the use of unit cells 10 per se in some cases, in such cases, the presence of extremely increased number of connections conceivably causes a situation to occur wherein deterioration in one unit cell causes deterioration in a whole of the battery and, additionally, due to the presence of an increased number of unit cells, mass per se increases with a resultant difficulty caused in minimizing vibrations.

Accordingly, in an actual practice, it is desirable for the battery to be formed by a certain, suitable number of unit cells and, subsequently, to allow a plurality of these batteries to be connected to one another in a final composite battery.

Figure 22:
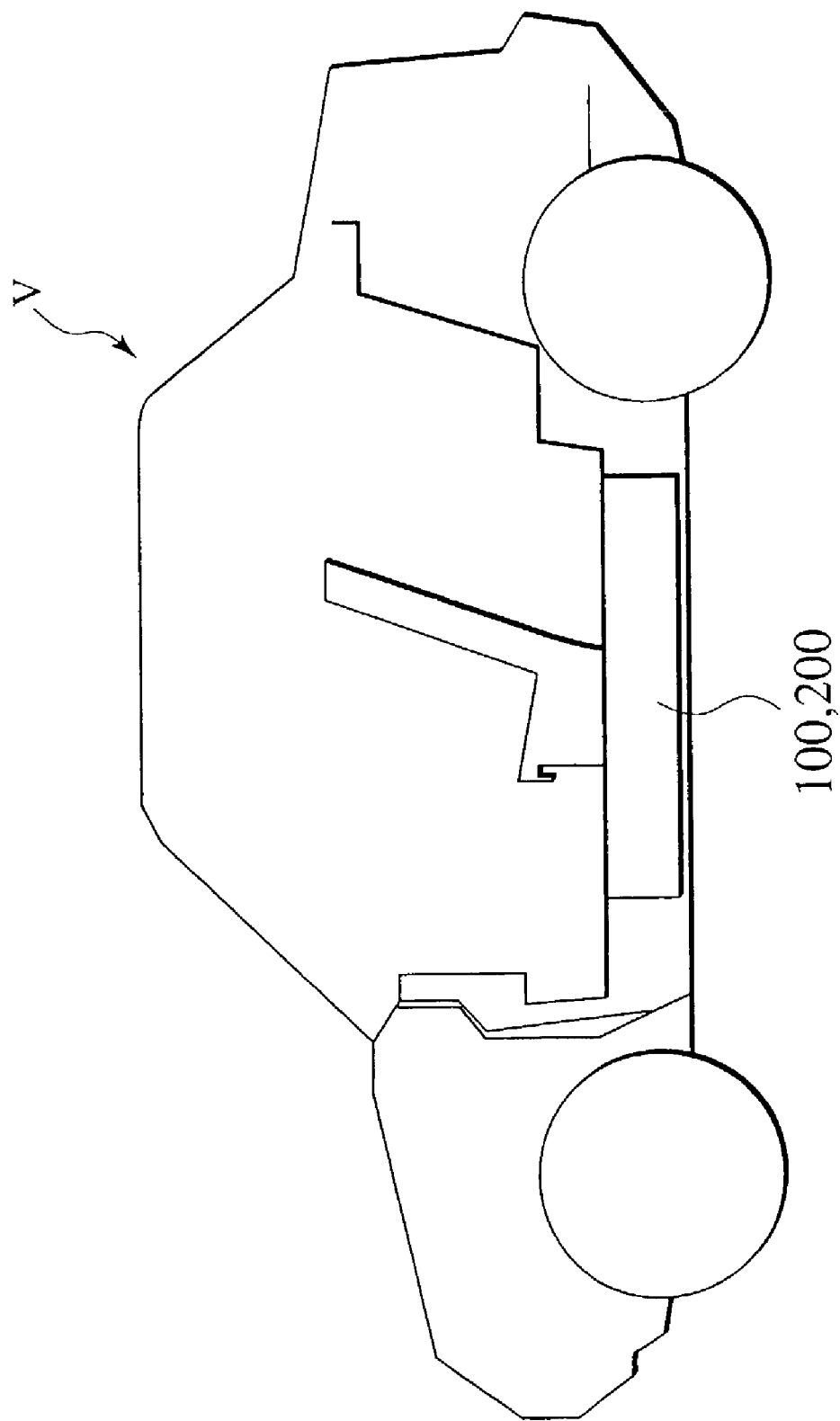
FIG. 22 is a typical view illustrating a vehicle to which the battery or the composite battery are applied, in the embodiment.

Such a composite battery 200 may be preferably installed in a central area of a vehicle body, as shown in FIG. 22, at a position beneath seats thereof, of an electric vehicle or a hybrid vehicle V to be convenient for the purpose of providing a wide trunk room. However, such a structure is not restrictive and the composite battery may be installed in a position beneath a rear trunk room or may be installed in an area in front of a vehicle body where an engine might be installed provided that no engine is installed like in the electric vehicle. Also, in dependence on a purpose to be used, the battery 100 may be installed in place of the composite battery 200, or the battery and composite battery may be installed in combination. Also, vehicles in which such a battery and/or composite battery can be installed may include the above-described electric vehicle and the hybrid vehicle, but these are not restrictive.

Here, when applying such a battery to a vehicle such as an automobile, it is important for the resonant frequency of the battery to be shifted from a particular frequency range at which the vibrations occur in the automobile. While, even in the mass spring system with multiple degrees of freedom, of course, it is impossible to remove the resonant frequency, it is possible to remove the resonant frequency of the battery from the frequency range that would occur on the automobile. By so doing, as far as the battery is used on the vehicle, there is an effect wherein the battery does not reach the resonant frequency. Especially, the vibration absorption frequency required for the battery falls in a range equal to or greater than 10 Hz and equal to or less than 100 Hz, and it is more preferable for the primary resonant frequency to be shifted to a range equal to or above 200 Hz. Also, in a frequency range below 10 Hz, there is less probability in occurrence of the resonant frequency from the viewpoint of a size of the battery. Moreover, if the resonant frequency exceeds 200 Hz and further goes beyond 1 kHz, such a resonant frequency enters a sound area, resulting in a need for a vibration absorption characteristic. Additionally, in an actual practice, it is required to form a structure such that the primary resonant frequency can be shifted to a high frequency range by at least 75 Hz.

Figure 23A:
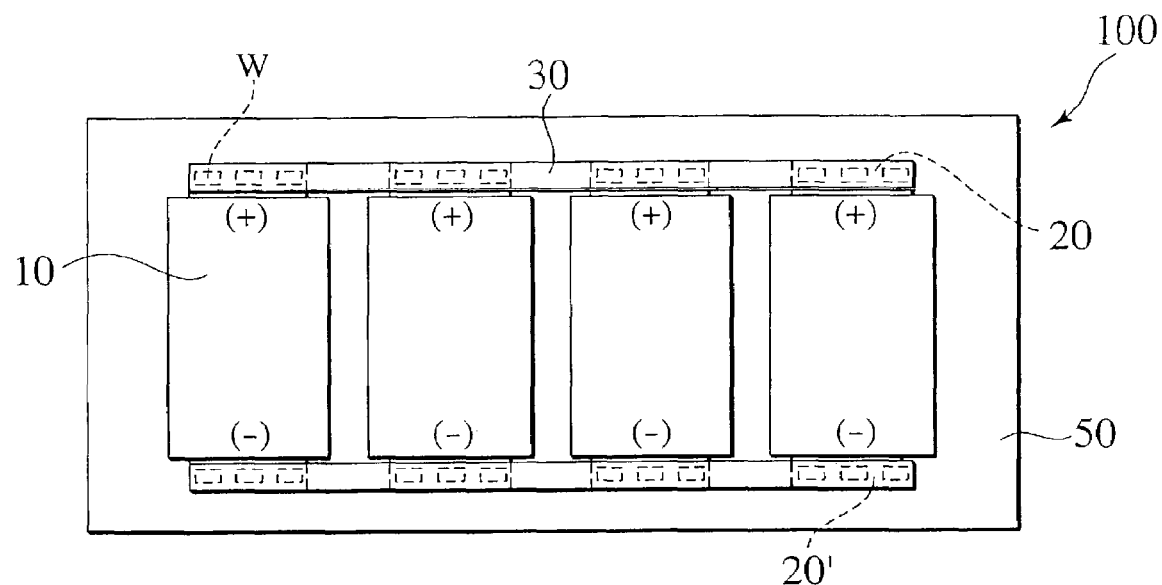
FIG. 23A is a plan view of the battery, which corresponds to FIG. 1B, which is formed typically of 4-parallel connected unit cells each having opposing sides from which the positive electrode tab and the negative electrode tab protrude, in the embodiment.
Figure 23B:
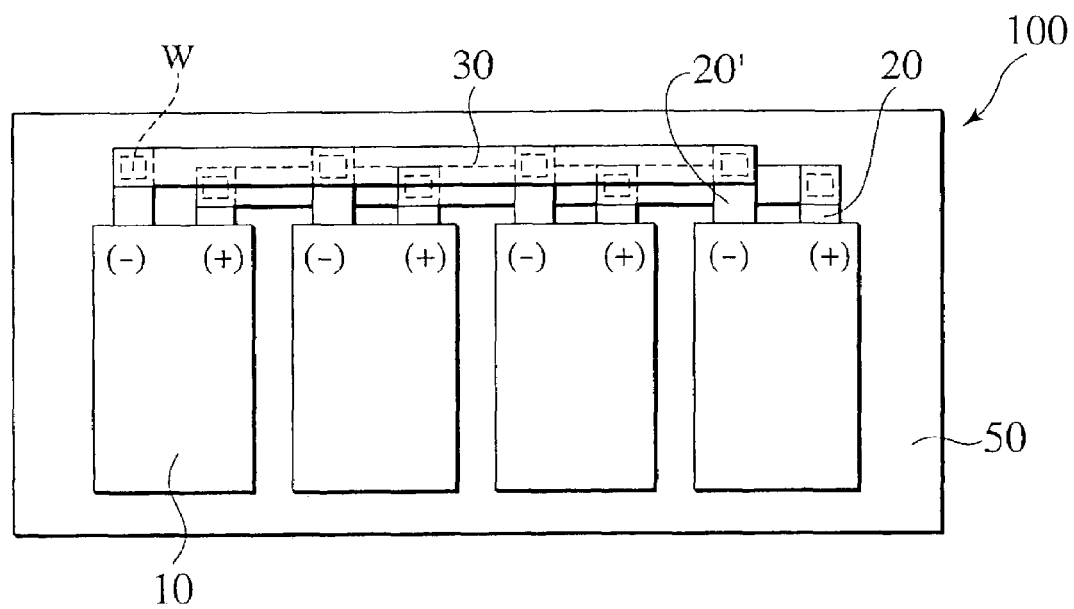
FIG. 23B is a plan view of the battery, which corresponds to FIG. 1B, which is formed typically of 4-parallel connected unit cells each having one side from which the positive electrode tab and the negative electrode tab protrude, in the embodiment.

Further, FIG. 23A shows a battery 100 of the presently filed embodiment formed by four parallel-connected unit cells 10 shown in FIG. 2 or the like, and FIG. 23B shows another battery 100 of the presently filed embodiment formed by four parallel-connected unit cells 10 shown in FIG. 17A or the like. Also, in the figures, W designates a welded portion between the tabs 20, 20' and the bus bars 30.

Figure 24:
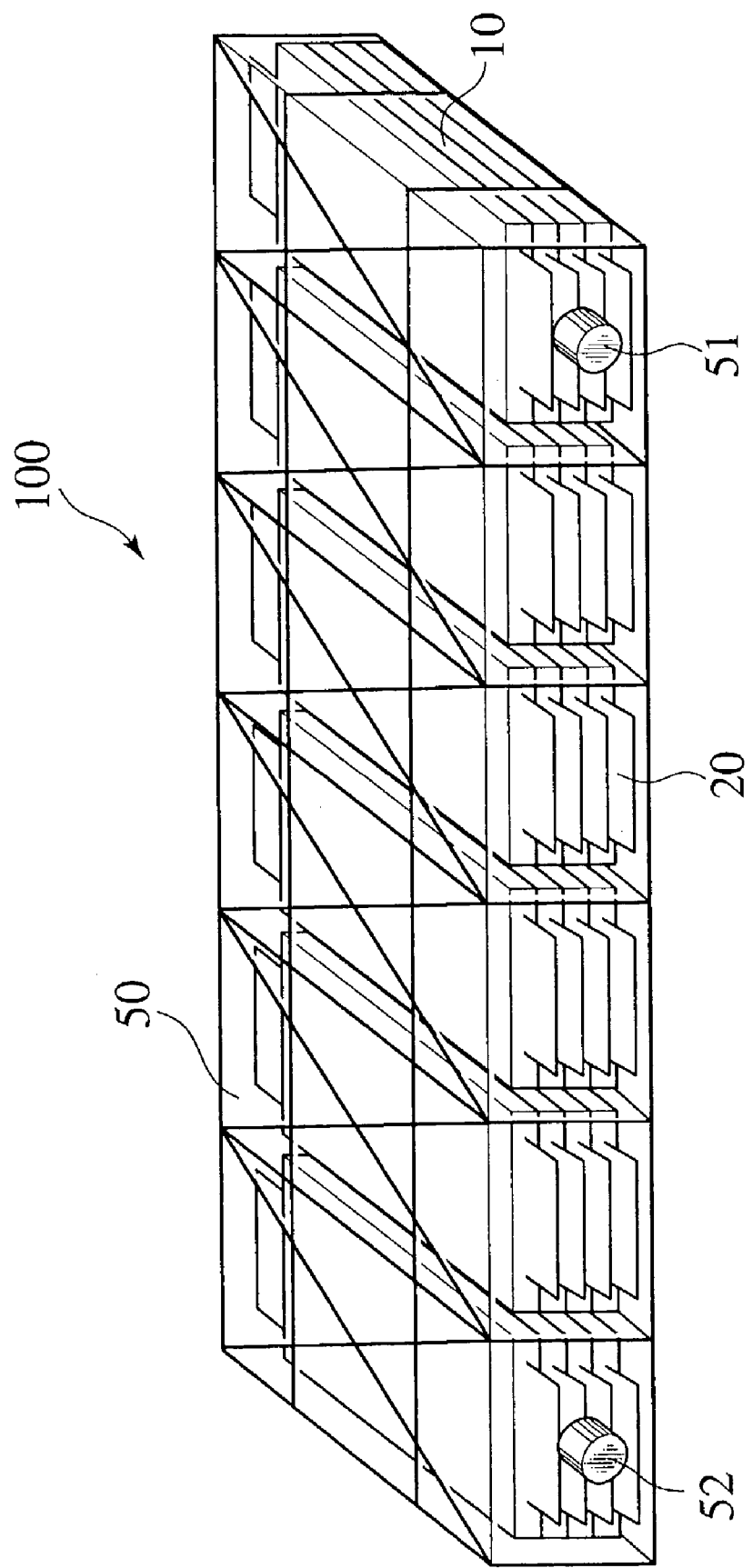
FIG. 24 is a perspective view of the battery, with an internal part being shown in a skeleton way, in the embodiment.

Furthermore, FIG. 24 shows a perspective view of another battery 100 of the presently filed embodiment formed by using the unit cells 10 shown in FIG. 2 or the like, with an interior being shown in a skeleton manner. Also, in the figure, bus bar is omitted.

Hereinafter, various Examples of the presently filed embodiments are further described in detail. Of course, the present invention is not limited by these Examples.

EXAMPLE 1

First, Example 1 is described in detail.

The unit cells 10 [each of which had a thickness of 4 mm, the positive electrode tab 20 made of Al, the negative electrode tab 20' made of Ni, the positive-electrode current collector 12 made of Al, the negative electrode current collector 13 made of Cu, a ratio (St/Sg=0.28) of 28% between the cross sectional area St of each of the tabs 20, 20' and the cross sectional area Sg of each general welded portion of the sides of the outer sheath film 60 from which the tabs 20, 20' protrude, a ratio (ta/tA=0.6) of 60% between the thickness ta of each of the tabs 20, 20' and the thickness tA of each general welded portion of the sides of the outer sheath film 60 from which the tabs 20, 20' protrude, a ratio (Wt/Wb=0.47) of 47% between the tab width Wb of each of the tabs 20, 20' and the length of the side, that is, the associated battery width Wb, of the outer sheath film 60 from which the tabs 20, 20' protrude, the polymer layer P made of PP and a ratio (Wb:Lb) between two sides falling in a range of 1:2] were applied in four-parallel connections in a connected condition shown in FIG. 23A and encompassed in the outer case 50 made of metal, thereby fabricating the battery 100.

And, such a battery 100 was subjected to a hammering test described later and a natural frequency spectrum of the outer case 50 was measured, revealing that the resonant primary peak frequency had shifted to a high frequency range by approximately 125 Hz with respect to a reference structure (that corresponds to a structure shown in a Reference Example described below). Also, an associated acceleration was measured at a frequency range from 10 to 300 Hz to measure an average value in the amount of reduction, resulting in a decrease in an average amount by 3 dB.

EXAMPLE 2

Next, Example 2 is described below in detail.

This Example differs in structure from Example 1 in that the unit cell 10 had the ratio (St/Sg=0.09) of 9% between the cross sectional area St of each of the tabs 20, 20' and the cross sectional area Sg of each general welded portion of the sides of the outer sheath film 60 from which the tabs protrude, and the ratio (ta/tA=0.2) of 20% between the thickness ta of each of the tabs 20, 20' and the thickness tA of each general welded portion of the sides of the outer sheath film 60 from which the tabs protrude, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 200 Hz with respect to the reference structure. Also, like in Example 1, the associated acceleration was measured at the frequency range from 10 to 300 Hz to measure an average value in the amount of reduction, resulting in a decrease in the average amount by 5 dB.

EXAMPLE 3

Next, Example 3 is described below in detail.

This Example differs in structure from Example 1 in that the battery employed the unit cells 10 with the structure shown in FIG. 11A and the unit cell 10 had the ratio (St/Sg=0.47) of 47% between the cross sectional area St of each of the tabs 20, 20' and the cross sectional area Sg of each general welded portion of the sides of the outer sheath film 60 from which the tabs protrude, the ratio (Wt/Wb=0.79) of 79% between the tab width Wt of each of the tabs 20, 20' and the length of the side, that is, the battery width Wb, of the sides of the outer sheath film 60 from which the tabs protrude and the polymer layer P made of modified PP, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 100 Hz with respect to the reference structure. Also, like in Example 1, the associated acceleration was measured at the frequency range from 10 to 300 Hz to measure an average value in the amount of reduction, resulting in a decrease in the average amount by 2 dB.

EXAMPLE 4

Next, Example 4 is described below in detail.

This Example differs in structure from Example 1 in that the battery employed the unit cells 10 with the structure shown in FIG. 11C and the unit cells 10 had the ratio (St/Sg=0.25) of 25% between the cross sectional area St of each of the tabs 20, 20' and the cross sectional area Sg of each general welded portion of the sides of the outer sheath film 60 from which the tabs protrude, the ratio (Wt/Wb=0.42) of 42% between the tab width Wt of each of the tabs 20, 20' and the length of the side, that is, the battery width Wb, of the sides of the outer sheath film 60 from which the tabs protrude and the polymer layer P made of PE, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 175 Hz with respect to the reference structure. Also, like in Example 1, the associated acceleration was measured at the frequency range from 10 to 300 Hz to measure an average value in the amount of reduction, resulting in a decrease in the average amount by 3 dB.

EXAMPLE 5

Next, Example 5 is described below in detail.

This Example differs in structure from Example 1 in that the unit cells 10 had the ratio (St/Sg=0.67) of 67% between the cross sectional area St of each of the tabs 20, 20' and the cross sectional area Sg of each general welded portion of the sides of the outer sheath film 60 from which the tabs protrude, the ratio (ta/tA=0.8) of 80% between the thickness ta of each of the tabs 20, 20' and the thickness tA of each general welded portion of the sides of the outer sheath film 60 from which the tabs protrude, the ratio (Wt/Wb=0.84) of 84% between the tab width Wt of each of the tabs 20, 20' and the length of the side, that is, the battery width Wb, of the sides of the outer sheath film 60 from which the tabs protrude and the polymer layer P made of modified PE, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 75 Hz with respect to the reference structure. Also, like in Example 1, the associated acceleration was measured at the frequency range from 10 to 300 Hz to measure an average value in the amount of reduction, resulting in a decrease in the average amount by 1 dB.

EXAMPLE 6

Next, Example 6 is described below in detail.

This Example differs in structure from Example 1 in that the battery employed the unit cells 10 with the structure shown in FIG. 12A and the unit cell 10 had the thickness of 8 mm, the negative electrode tab made of Cu and the polymer layer P made of ionomer, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 105 Hz with respect to the reference structure. Also, like in Example 1, the associated acceleration was measured at the frequency range from 10 to 300 Hz to measure an average value in the amount of reduction, resulting in a decrease in the average amount by 3.5 dB.

EXAMPLE 7

Next, Example 7 is described below in detail.

This Example differs in structure from Example 1 in that the battery employed the unit cells 10 with the structure shown in FIG. 12B and the unit cell 10 had the thickness of 8 mm, the negative electrode tab made of Fe and the polymer layer P made of ionomer, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 100 Hz with respect to the reference structure. Also, like in Example 1, the associated acceleration was measured at the frequency range from 10 to 300 Hz to measure an average value in the amount of reduction, resulting in a decrease in the average amount by 3 dB.

EXAMPLE 8

Next, Example 8 is described below in detail.

This Example differs in structure from Example 1 in that the battery employed the unit cells 10 with the structure shown in FIG. 13A and the unit cells 10 had the ratio (St/Sg=0.53) of 53% between the cross sectional area St of each of the tabs 20, 20' and the cross sectional area Sg of each general welded portion of the sides of the outer sheath film 60 from which the tabs protrude and the ratio (Wt/Wb=0.88) of 88% between the tab width Wt of each of the tabs 20, 20' and the length of the side, that is, the battery width Wb, of the sides of the outer sheath film 60 from which the tabs protrude, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 100 Hz with respect to the reference structure. Also, like in Example 1, the associated acceleration was measured at the frequency range from 10 to 300 Hz to measure an average value in the amount of reduction, resulting in a decrease in the average amount by 1.5 dB.

EXAMPLE 9

Next, Example 9 is described below in detail.

This Example differs in structure from Example 1 in that the battery employed the unit cells 10 with the structure shown in FIG. 13B and the unit cells 10 had the ratio (St/Sg=0.26) of 26% between the cross sectional area St of each of the tabs 20, 20' and the cross sectional area Sg of each general welded portion of the sides of the outer sheath film 60 from which the tabs protrude and the ratio (Wt/Wb=0.44) of 44% between the tab width Wt of each of the tabs 20, 20' and the length of the side, that is, the battery width Wb, of the sides of the outer sheath film 60 from which the tabs protrude, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 125 Hz with respect to the reference structure. Also, like in Example 1, the associated acceleration was measured at the frequency range from 10 to 300 Hz to measure an average value in the amount of reduction, resulting in a decrease in the average amount by 3 dB.

EXAMPLE 10

Next, Example 10 is described below in detail.

This Example differs in structure from Example 1 in that the battery employed the unit cells 10 with the structure shown in FIG. 14A and the unit cell 10 had the thickness of 8 mm, the ratio (St/Sg=0.26) of 26% between the cross sectional area St of each of the tabs 20, 20' and the cross sectional area Sg of each general welded portion of the sides of the outer sheath film 60 from which the tabs protrude and the ratio (Wt/Wb=0.44) of 44% between the tab width Wt of each of the tabs 20, 20' and the length of the side, that is, the battery width Wb, of the sides of the outer sheath film 60 from which the tabs protrude, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 175 Hz with respect to the reference structure. Also, like in Example 1, the associated acceleration was measured at the frequency range from 10 to 300 Hz to measure an average value in the amount of reduction, resulting in a decrease in the average amount by 2.5 dB.

EXAMPLE 11

Next, Example 11 is described below in detail.

This Example differs in structure from Example 1 in that the battery employed the unit cells 10 with the structure shown in FIG. 14B and the unit cell 10 had the thickness of 2 mm, the ratio (St/Sg=0.26) of 26% between the cross sectional area St of each of the tabs 20, 20' and the cross sectional area Sg of each general welded portion of the sides of the outer sheath film 60 from which the tabs protrude and the ratio (Wt/Wb=0.44) of 44% between the tab width Wt of each of the tabs 20, 20' and the length of the side, that is, the battery width Wb, of the sides of the outer sheath film 60 from which the tabs protrude, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 175 Hz with respect to the reference structure. Also, like in Example 1, the associated acceleration was measured at the frequency range from 10 to 300 Hz to measure an average value in the amount of reduction, resulting in a decrease in the average amount by 3 dB.

EXAMPLE 12

Next, Example 12 is described below in detail.

This Example differs in structure from Example 1 in that the battery employed the unit cells 10 with the structure shown in FIG. 18A and the unit cells 10 had the ratio (Wb:Lb) in length between the two sides falling in a range of 1:1, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 110 Hz with respect to the reference structure. Also, like in Example 1, the associated acceleration was measured at the frequency range from 10 to 300 Hz to measure an average value in the amount of reduction, resulting in a decrease in the average amount by 2.5 dB.

EXAMPLE 13

Next, Example 13 is described below in detail.

This Example differs in structure from Example 1 in that the battery employed the unit cells 10 with the structure shown in FIG. 18C and the unit cells 10 had the ratio (Wb:Lb) in length between the two sides falling in a range of 1:3, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 90 Hz with respect to the reference structure. Also, like in Example 1, the associated acceleration was measured at the frequency range from 10 to 300 Hz to measure an average value in the amount of reduction, resulting in a decrease in the average amount by 3.5 dB.

EXAMPLE 14

Next, Example 14 is described below in detail.

This Example differs in structure from Example 1 in that the battery employed the unit cells 10 connected in 4-parallel connection under a connected condition shown in FIG. 19A, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 100 Hz with respect to the reference structure. Also, like in Example 1, the associated acceleration was measured at the frequency range from 10 to 300 Hz to measure an average value in the amount of reduction, resulting in a decrease in the average amount by 3 dB.

EXAMPLE 15

Next, Example 15 is described below in detail.

This Example differs in structure from Example 1 in that the battery employed the unit cells 10 connected in 2-parallel-12-series connection under a connected condition shown in FIG. 1, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that the resonant primary peak frequency had shifted to the high frequency range by approximately 120 Hz with respect to the reference structure. Also, like in Example 1, the associated acceleration was measured at the frequency range from 10 to 300 Hz to measure an average value in the amount of reduction, resulting in a decrease in the average amount by 4 dB.

COMPARATIVE EXAMPLE 1

Next, Comparative Example 1 is described below in detail.

This Comparative Example differs in structure from Example 1 in that the unit cell 10 had the ratio (St/Sg=0.06)

of 6% between the cross sectional area St of each of the tabs 20, 20' and the cross sectional area Sg of each general welded portion of the sides of the outer sheath film 60 from which the tabs protrude and the ratio (Wt/Wb=0.11) of 11% between the tab width Wt of each of the tabs 20, 20' and the length of the side, that is, the battery width Wb, of the sides of the outer sheath film 60 from which the tabs protrude, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that no shift occurred in the resonant primary peak frequency. Also, like in Example 1, the associated acceleration was measured at the frequency range from 10 to 300 Hz to measure an average value in the amount of reduction, resulting in a decrease in the average amount by 0 dB.

COMPARATIVE EXAMPLE 2

Next, Comparative Example 2 is described below in detail.

This Comparative Example differs in structure from Example 1 in that the unit cell 10 had the ratio (St/Sg=1.05) of 105% between the cross sectional area St of each of the tabs 20, 20' and the cross sectional area Sg of each general welded portion of the sides of the outer sheath film 60 from which the tabs protrude, the ratio (ta/tA=2.0) of 200% between the thickness ta of each of the tabs 20, 20' and the thickness tA of each general welded portion of the sides of the outer sheath film 60 from which the tabs protrude and the ratio (Wt/Wb=0.53) of 53% between the tab width Wt of each of the tabs 20, 20' and the length of the side, that is, the battery width Wb, of the sides of the outer sheath film 60 from which the tabs protrude, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured, revealing that no shift occurred in the resonant primary peak frequency. Also, like in Example 1, the associated acceleration was measured at the frequency range between 10 to 300 Hz to measure an average value in the amount of reduction, resulting in a decrease in the average amount by −0.5 dB.

COMPARATIVE EXAMPLE 3

Next, Comparative Example 3 is described below in detail.

In this Comparative Example, the battery 100 was fabricated using the unit cells 10 similarly prepared in the same structure as that of Example 1 except that the polymer layer P was not included.

And, such a battery 100 was subjected to the hammering test, like in Example 1, and the natural frequency spectrum of the outer case 50 was measured, revealing that no shift occurred in the resonant primary peak frequency. Also, like in Example 1, the associated acceleration was measured at the frequency range from 10 to 300 Hz to measure an average value in the amount of reduction, resulting in a decrease in the average amount by −0.5 dB.

REFERENCE EXAMPLE

Next, Reference Example is described below in detail.

This Reference Example differs in structure from Example 1 in that the battery employed the unit cells 10 with the structure shown in FIGS. 17A and 17B and the unit cell 10 had the ratio (St/Sg=0.06) of 6% between the cross sectional area St of each of the tabs 20, 20' and the cross sectional area Sg of each general welded portion of the sides of the outer sheath film 60 from which the tabs protrude and the ratio (Wt/Wb=0.11) of 11% between the tab width Wt of each of the tabs 20, 20' and the length of the side, that is, the battery width Wb, of the sides of the outer sheath film 60 from which the tabs protrude whereupon, further, the unit cells were arranged in 4-parallel connection under a connected condition shown in FIG. 23B, but the battery 100 was fabricated using the unit cells 10 in the same structure as that of Example 1 in other aspects.

And, such a battery 100 was subjected to the hammering test, like in Example 1, and the natural frequency spectrum of the outer case 50 was measured. Also, like in Example 1, the associated acceleration was measured at the frequency range from 10 to 300 Hz to measure an average value in the amount of reduction.

The batteries obtained in the above-described Examples 1 to 15, Comparative Examples 1 to 3 and Reference Example were subjected to the following tests. Obtained results are indicated in Tables 1 and 2 (described later) together with specifications of the respective batteries.

1. Hammering Test

An acceleration pickups were set at substantially central portions of the outer cases of the batteries of various Examples 1 to 15 set forth above, Comparative Examples 1 to 3, and Reference Example, and vibration spectrums of the acceleration pickups resulting when performed hammering portions of the outer cases by impulse hammers were measured. The setting method was based on JIS B0908 (Correction Method and Basic Concept On Vibration and Impact Pickup).

And, measured spectrums were analyzed using FFT analyzer and converted in dimensions of a frequency and acceleration, thereby obtaining resonant frequency spectrums. One of the resulting resonant frequency spectrums in such a way which appeared at the lowest frequency range was assigned as a primary resonant frequency (first order resonant frequency).

Also, the difference between the primary resonant frequencies was defined as a difference between the primary resonant frequency of the battery of Reference Example and the primary resonant frequency of each of the batteries of respective Examples. Further, for the tests of Examples 14 and 15, the same outer cases as those of other Examples were used.

2. Measurements of Average Reduction Rate

The accelerations resulting from the spectrums measured on the above-described hammering tests were averaged, in a range from 10 to 300 Hz, to provide a resulting average value, and the average reduction rate (average amount of reduction) was calculated by subtracting from the resulting average value of each of Examples 1 to 15 and Comparative Examples 1 to 3, an amount of reduction of the battery of Reference Example corresponding to its average value itself. It is meant that the larger the resulting numerical value of the average reduction rate, the smaller will be the degree of vibrations provided by the structures of the presently filed embodiments or the like.

TABLE 1

|  | Shape of Unit Cell | Connect. condit. | Thickn. of Gen. Seal (mm) | Width of Outer Sheath (mm) | Width of Current Collector (mm) | Thickn. of Tab (mm) | Width of Tab (mm) |
|---|---|---|---|---|---|---|---|
| Example 1 | FIG. 11B | 4-Paral. (FIG. 23A) | 0.25 | 95 | 75 | 0.15 | 45 |
| Example 2 | ↑ | ↑ | 0.25 | 95 | 75 | 0.05 | 45 |
| Example 3 | FIG. 11A | ↑ | 0.25 | 95 | 75 | 0.15 | 75 |
| Example 4 | FIG. 11C | ↑ | 0.25 | 95 | 75 | 0.15 | 40 |
| Example 5 | FIG. 11B | ↑ | 0.25 | 95 | 75 | 0.2 | 80 |
| Example 6 | FIG. 12A | ↑ | 0.25 | 95 | 75 | 0.15 | 45 |
| Example 7 | FIG. 12B | ↑ | 0.25 | 95 | 75 | 0.15 | 45 |
| Example 8 | FIG. 13A | ↑ | 0.25 | 160 | 140 | 0.15 | 140 |
| Example 9 | FIG. 13B | ↑ | 0.25 | 160 | 140 | 0.15 | 70 |
| Example 10 | FIG. 14A | ↑ | 0.25 | 160 | 140 | 0.15 | 70 |
| Example 11 | FIG. 14B | ↑ | 0.25 | 160 | 140 | 0.15 | 70 |
| Example 12 | FIG. 18A | ↑ | 0.25 | 95 | 75 | 0.15 | 45 |
| Example 13 | FIG. 18C | ↑ | 0.25 | 95 | 75 | 0.15 | 45 |
| Example 14 | FIG. 11B | 4-Paral. (FIG. 19A) | 0.25 | 95 | 75 | 0.15 | 45 |
| Example 15 | FIG. 11B | 2-Paral. 12-Ser. (FIG. 1) | 0.25 | 95 | 75 | 0.15 | 45 |
| Comparative Example 1 | FIG. 11B | 4-Paral. (FIG. 23A) | 0.25 | 95 | 75 | 0.15 | 10 |
| Comparative Example 2 | FIG. 11B | ↑ | 0.25 | 95 | 75 | 0.5 | 50 |
| Comparative Example 3 | FIG. 11B | ↑ (No resin) | 0.25 | 95 | 75 | 0.15 | 45 |
| Ref. Example | FIG. 17A | 4-Paral. (FIG. 23B) | 0.25 | 95 | 75 | 0.15 | 10 |

TABLE 2

|  | Ratio of Cross Sect. Area between Tab and General Seal Port. (%) | Ratio of Thickn. between Tab and General Seal Port. (%) | Ratio of Width between Tab and Outer Sheath (%) | Thickn. of Unit Cell (%) | Differ. in Primary Freque. (Hz) | Average Reduct. Rate (dB) |
|---|---|---|---|---|---|---|
| Example 1 | 28% | 60% | 47% | 4 | 125 | 3 |
| Example 2 | 9% | 20% | 47% | 4 | 200 | 5 |
| Example 3 | 47% | 60% | 79% | 4 | 100 | 2 |
| Example 4 | 25% | 60% | 42% | 4 | 175 | 3 |
| Example 5 | 67% | 80% | 84% | 4 | 75 | 1 |
| Example 6 | 28% | 60% | 47% | 8 | 105 | 3.5 |
| Example 7 | 28% | 60% | 47% | 8 | 100 | 3 |
| Example 8 | 53% | 60% | 88% | 4 | 100 | 1.5 |
| Example 9 | 26% | 60% | 44% | 4 | 125 | 3 |

TABLE 2-continued

| | Ratio of Cross Sect. Area between Tab and General Seal Port. (%) | Ratio of Thickn. between Tab and General Seal Port. (%) | Ratio of Width between Tab and Outer Sheath (%) | Thickn. of Unit Cell (%) | Differ. in Primary Freque. (Hz) | Average Reduct. Rate (dB) |
|---|---|---|---|---|---|---|
| Example 10 | 26% | 60% | 44% | 2 | 170 | 2.5 |
| Example 11 | 26% | 60% | 44% | 2 | 175 | 3 |
| Example 12 | 28% | 60% | 47% | 4 | 110 | 2.5 |
| Example 13 | 28% | 60% | 47% | 4 | 90 | 3.5 |
| Example 14 | 28% | 60% | 47% | 4 | 100 | 3 |
| Example 15 | 28% | 60% | 47% | 4 | 120 | 4 |
| Comparative Example 1 | 6% | 60% | 11% | 4 | 0.1 | 0 |
| Comparative Example 2 | 105% | 200% | 53% | 4 | 0 | −0.5 |
| Comparative Example 3 | 28% | 60% | 47% | 4 | 0 | −0.5 |
| Ref. Example | 6% | 60% | 11% | 4 | Ref. | Ref. |

As clearly seen from results indicated in Table 2 related to the structures shown in Table 1, in Examples 1 to 15 which belong to numerical ranges defined in the presently filed embodiments, it is understood that operations in various factors enable the primary resonant frequency to be shifted to the high frequency range with respect to the specification of Reference and, also, reduction occurs in transfer of vibrations for preventing resonant vibrations from occurring with the vibrations caused by the vehicle, resulting in a capability of eliminating loads to be imparted to the tabs.

On the contrary, in Comparative Examples 1 to 3 of which structures assumes values outside the numeric values defined in the presently filed embodiments, results were obtained with no such effects.

From the foregoing description, according to the batteries of the presently filed embodiments and the related methods, a vibration absorption performance can be realized regardless of an inability caused in the related art structures and, additionally, it is made possible to provide a compatibility between reduction in the internal resistance and improvement in heat performance.

The entire content of a Patent Application No. TOKUGAN 2002-161333 with a filing date of Jun. 3, 2002 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A battery comprising:
   at least two unit cells, each of the at least two unit cells being provided with:
   an outer sheath film having a layered structure in which a resin film and a metal film are layered;
   a positive-electrode current collector;
   a negative-electrode current collector;
   a separator disposed between the positive-electrode current collector and the negative-electrode current collector;
   one positive electrode tab to which the positive-electrode current collector is connected and protruding from a first sealed portion of the outer sheath film to form a first extending portion to which a first connecting member is connected;
   one negative electrode tab to which the negative-electrode current collector is connected and protruding from a second sealed portion of the outer sheath film to form a second extending portion to which a second connecting member connected, the one positive electrode tab and the one negative electrode tab protruding in opposite directions with respect to a corresponding unit cell;
   a first polymer layer wholly disposed at a boundary area between the positive electrode tab and the layered structure of the outer sheath film; and
   a second polymer layer wholly disposed at a boundary area between the negative electrode tab and the layered structure of the outer sheath film,
   wherein the outer sheath film is quadrangular as viewed along a thickness direction thereof to have sides, and at least one of the positive electrode tab and the negative electrode tab protrudes from one side among the sides of the outer sheath film,
   and wherein a value resulting by subtracting a width of the at least one of the positive electrode tab and the negative electrode tab from a width of a corresponding one of the positive-electrode current collector and the negative-electrode current collector is equal to or less than the width of the at least one of the positive electrode tab and the negative electrode tab, and a cross sectional area of the at least one of the positive electrode tab and the negative electrode tab at the one side of the outer sheath film is less than a cross sectional area of only the outer sheath film at the side of the outer sheath film.

2. The battery according to claim 1, wherein masses, springs and damping of the outer sheath film, the positive-electrode current collector, the negative-electrode current collector and the separator form a mass spring system, masses and springs of the positive electrode tab, the first polymer layer, the negative electrode tab and the second polymer layer form a pseudo mass spring system, and the mass spring system and the pseudo mass spring system form a mass spring system with a multiple-degree of freedom having at least two degrees of freedom.

3. The battery according to claim 2, wherein upon adjustment of either one of the masses, the springs and the damping of the outer sheath film, the positive-electrode current collector, the negative-electrode current collector and the separator and the masses and springs of the positive electrode tab, the first polymer layer, the negative electrode tab and the second polymer layer, a primary resonant frequency of the multiple-degree of freedom can be freely adjustable.

4. The battery according to claim 1, wherein a cross sectional area of at least one of the positive electrode tab and the negative electrode tab at a side of the outer sheath film from which the at least one of the positive electrode tab and the negative electrode tab protrudes falls in a range from a value equal to or greater than 5% to a value equal to or less than 70% of a cross sectional area of only the outer sheath film at the side of the outer sheath film.

5. The battery according to claim 1, wherein a thickness of at least one of the positive electrode tab and the negative electrode tab falls in a range from 20 to 80% of a thickness of the outer sheath film at a side thereof from which the at least one of the positive electrode tab and the negative electrode tab protrudes.

6. The battery according to claim 1, wherein a width of at least one of the positive electrode tab and the negative electrode tab at a side of the outer sheath film from which the at least one of the positive electrode tab protrudes and the negative electrode tab falls in a range from a value of equal to or greater than 30% of a length of the side to a value of equal to or less than 80% of the length of the side.

7. The battery according to claim 1, wherein the positive electrode tab and the negative electrode tab protrude from different sides of the outer sheath film.

8. The battery according to claim 1, wherein the each of the at least two unit cells has a maximum thickness from a value equal to or greater than 1 mm to a value equal to or less than 10 mm.

9. The battery according to claim 1, wherein the each of the at least two unit cells has two sides respectively perpendicular to a thickness direction thereof to cross to each other, and a ratio between the two sides respectively perpendicular to the thickness direction of the each of the at least two unit cells to cross to each other falls in a range from 1:1 to 1:3.

10. The battery according to claim 1, wherein the positive electrode tab or the negative electrode tab is composed of at least one kind selected from a group consisting of Ni, Cu, Al and Fe.

11. The battery according to claim 1, wherein the polymer layer is composed of at least one kind selected from a group consisting of polypropylene, modified polypropylene, polyethylene, modified polyethylene and ionomer.

12. The battery according to claim 1, wherein positive electrode material of the positive-electrode current collector is composed of lithium-manganese series composite oxide.

13. The battery according to claim 1, wherein negative electrode material of the negative-electrode current collector is composed of crystalline carbon material, non-crystalline carbon material or combination of the crystalline carbon material and the non-crystalline carbon material.

14. The battery according to claim 2, wherein a primary resonant frequency of the mass spring system with the multiple-degree of freedom is enabled to shift to a high frequency range by at least 75 Hz.

15. The battery according to claim 1, wherein there is at least one group in which equal to or more than two pieces among the at least two unit cells are connected in parallel and, within the at least one group, the at least two unit cells are stacked to allow the positive electrode tabs, in the same number as that in which the at least two unit cells are stacked, to be mutually welded and to allow the negative electrode tabs, in the same number as that in which the at least two unit cells are stacked, to be mutually welded.

16. The battery according to claim 1, wherein there is at least one group in which equal to or more than two pieces among the at least two unit cells are connected in parallel and, within the at least one group, the at least two unit cells are juxtaposed such that corresponding sides of the at least two unit cells are aligned to allow the positive electrode tabs of the at least two unit cells to be connected to one bus bar and to allow the negative electrode tabs of the at least two unit cells to be connected to another bus bar.

17. The battery according to claim 1, wherein more than two batteries are arranged in series connection, in parallel connection and in combination of the parallel connection and the series connection to form a composite battery.

18. The battery according to claim 17, wherein the battery or the composite battery is installed on a vehicle.

19. A method of manufacturing a battery, the method comprising:
preparing at least two unit cells, each of the at least two unit cells being provided with:
an outer sheath film having a layered structure in which a resin film and a metal film are layered;
a positive-electrode current collector;
a negative-electrode current collector;
a separator disposed between the positive-electrode current collector and the negative-electrode current collector;
one positive electrode tab to which the positive-electrode current collector is connected and protruding from a first sealed portion of the outer sheath film to form a first extending portion to which a first connecting member is connected;
one negative electrode tab to which the negative-electrode current collector is connected and protruding from a second sealed portion of the outer sheath film to form a second extending portion to which a second connecting member is connected, the one positive electrode tab and the one negative electrode tab protruding in opposite directions with respect to a corresponding unit cell;
a first polymer layer wholly disposed at a boundary area between the positive electrode tab and the layered structure of the outer sheath film; and
a second polymer layer wholly disposed at a boundary area between the negative electrode tab and the layered structure of the outer sheath film;
connecting the at least two unit cells so as to form at least one group which includes equal to or more than two parallel connections of the at least two unit cells,
wherein the outer sheath film is quadrangular as viewed along a thickness direction thereof to have sides, and at least one of the positive electrode tab and the negative electrode tab protrudes from one side among the sides of the outer sheath film, and wherein a value resulting by subtracting a width of the at least one of the positive electrode tab and the negative electrode tab from a width of a corresponding one of the positive-electrode current collector and the negative-electrode current collector is equal to or less than the width of the at least one of the positive electrode tab and the negative electrode tab, and a cross sectional area of the at least one of the positive electrode tab and the negative electrode tab at the one side of the outer sheath film is less than a cross sectional area of only the outer sheath film at the side of the outer sheath film.

* * * * *